March 10, 1970 B. J. WARMAN 3,500,442

TELEPHONE SWITCHING NETWORK WITH ALL AUXILIARY EQUIPMENT CONNECTED TO LINE SIDE

Filed Aug. 1, 1966 13 Sheets-Sheet 1

March 10, 1970 B. J. WARMAN 3,500,442

TELEPHONE SWITCHING NETWORK WITH ALL AUXILIARY EQUIPMENT CONNECTED TO LINE SIDE

Filed Aug. 1, 1966 13 Sheets-Sheet 2

March 10, 1970 B. J. WARMAN 3,500,442

TELEPHONE SWITCHING NETWORK WITH ALL AUXILIARY EQUIPMENT CONNECTED TO LINE SIDE

Filed Aug. 1, 1966 13 Sheets-Sheet 5

March 10, 1970 B. J. WARMAN 3,500,442

TELEPHONE SWITCHING NETWORK WITH ALL AUXILIARY EQUIPMENT CONNECTED TO LINE SIDE

Filed Aug. 1, 1966 13 Sheets-Sheet 7

March 10, 1970 B. J. WARMAN 3,500,442

TELEPHONE SWITCHING NETWORK WITH ALL AUXILIARY EQUIPMENT CONNECTED TO LINE SIDE

Filed Aug. 1, 1966 13 Sheets-Sheet 12

United States Patent Office 3,500,442

Patented Mar. 10, 1970

3,500,442

TELEPHONE SWITCHING NETWORK WITH ALL AUXILIARY EQUIPMENT CONNECTED TO LINE SIDE

Bloomfield James Warman, London, England, assignor to Associated Electrical Industries Limited, London, England, a British company Filed Aug. 1, 1966, Ser. No. 569,230
Claims priority, application Great Britain, Aug. 18, 1965, 35,437/65; Jan. 10, 1966, 1,132/66
Int. Cl. H04m 3/22
U.S. Cl. 179—18 10 Claims

ABSTRACT OF THE DISCLOSURE

A telephone exchange switching system comprises a switching network arranged in stages and connected on one side to line terminals and on the other to link circuits. All auxiliary equipment including registers, ringing control circuits, trunk circuits etc., are connected to line terminals in the same manner as calling and called lines so that the switching network is used exclusively for establishing paths between different line terminals. Calling and called lines are interconnected by serial "short term" paths including all necessary items of auxiliary equipment and also by a "long term" path through the switching network in parallel with the short term paths. Proper set-up of all paths can then be checked by the continuity of the loop so formed.

This invention relates to automatic telecommunication switching systems.

At the end of this specification, immediately preceding the claims, there is given a biblography of prior patents and co-pending patent applications concerning certain recent inventions in automatic telecommunication switching systems. The present invention is related in some aspects to these recent inventions and in describing the present invention numerous references are made in this specification to these prior patents and co-pending patent applications which are identified by the index letters allocated to them in the bibliography.

Basically, and in general terms, the concept of so-called "sectionalisation" in automatic telecommunications exchange design (*a*) is to provide the switching equipment, which in an automatic telecommunications exchange permits the selective establishment of communication paths between lines connected to the exchange, in a plurality of sections to a plurality of which each line has access and through each of which the switcing equipment affords a plurality of selectable routes for the establishment of communication paths, and to provide also a section selecting arrangement which in respect of a call between two lines, and on the basis of information fed to it as to pertinent conditions relative to the several sections, is operable to cause the establishment of a communication path between said two lines over such ones of the selectable routes as will give best advantage having regard to said conditions. This concept of "sectionalisation" is capable of considerable extension and elaboration from and beyond its basic form.

Hereinafter the terms "section" and "sections" are to be understood as being used in reference to the sections in which the switching equipment of an automatic telecommunications exchange is provided in accordance with the concept referred to.

There is known (*b*) an automatic telecommunications exchange which embodies the concept referred to, and which employs co-ordinate switching arrays preferably (but not necessarily) constituted by cross-point arrays using reed relays. In this exchange the switching equipment is arranged so that in general, as regards any complete communication path through the switching equipment between any two lines connected to the exchange, the path involves two of the sections, namely a section affording an incoming portion of the path and a different section affording an outgoing portion of the path, and a link circuit (linkpath) interconnecting said two portions of the path. A link circuit serving local calls includes a supervisory transmission bridge arrangement to which supervision is transferred once a call for which the link circuit is taken into use has been set up or has encountered a busy condition of the called line. On the other hand, a link circuit serving outgoing junction calls does not need to include a supervisory transmission bridge arrangement, the reason for this being that the necessary supervisory transmission bridge arrangements for outgoing junction calls are included in the outgoing junction equipments. The lines connected to the exchange have access into the several sections through a first or A rank of co-ordinate switching arrays having only one "cross-point" per line per section.

There has been proposed (*c*) an invention which, in an important application thereof, enables an advantageous modification of the automatic telecommunications exchange just considered to be achieved, a main advantage of the modification being that it results in a reduction in the amount of switching equipment required to give the traffic of the exchange access to the link circuits of the exchange. This particular modification consists in providing the link circuits in the form of compound link circuits each comprising (i) a constituent bridge link which includes a supervsory transmission bridge arrangement, (ii) a constituent "through" link not including such a bridge arrangement, and (iii) switching means whereby each of these constituent links can be selectively connected individually on one of its two sides to either trunk of a first pair of communication path trunks connected to the compound link circuit and can be selectively connected individually on the other of its two sides to either trunk of a second pair of communication path trunks connected to the compound link circuit, each said pair of communication path trunks comprising a terminal trunk pertaining to switching equipment serving local subscribers' lines and a terminal trunk pertaining to switching equipment serving junction lines. Each of these compound link circuits is such that in suitable circumstances it can be in use, providing requisite links on two calls at the same time. Moreover, provision may be included for "splitting" the constituent "through" link of such a compound link circuit if and when necessary to prevent transmission over it.

There has also been proposed (*d*) an invention which in an important application thereof enables a further advantageous modification to be achieved, the main advantage of this further modification being that as a result of it the risk of the occurrence of congestion due to the fact that the first or A rank of co-ordinate switching relays has only one cross-point per line per section, is considerably reduced. This further modification which also concerns an automatic telecommunications exchange in which switching equipment is provided in sections in accordance with the concept described above and in which a basic or normal form of connection path set up through the switching equipment comprises incoming and outgoing portions established through different switching sections and linked by way of a link circuit, consists in providing a transfer circuit (referred to as a planar transfer circuit) through the medium of which two communication paths of said basic or normal form can be connected and utilised in serial relationship when traffic or other considerations render such action appropriate.

The present invention provides what is believed to be a new concept in the organization of telecommunications switching systems, particularly those which employ electronic common control equipment, and leads to improved economy and simplification of the switching equipment and of the control equipment in such systems, as well as providing other important advantages as will later be made clear. While the present invention finds particularly useful application in automatic telecommunications exchanges having "sectionalised" switching equipment (*a*), (*b*), it is not necessarily restricted to such exchanges.

According to one feature of the present invention there is provided an automatic telecommunication switching system having a switching network comprising switching means arranged in one or more switching ranks or stages and operable to effect connection between line terminals at one side of the network and link circuits at the other side of the network, together with common control equipment for controlling the operation of said switching means in the establishment of communications paths through the switching network between specific calling and called lines connected to certain of said line terminals, in which system there are also connected to others of said line terminals items of auxiliary equipment (for example registers, senders, coin-fee check circuits and tone circuits) which can be taken into use on a call, as and when required, and in which system for a call between calling and called lines the common control equipment is arranged to establish at least two communication paths through the switching network between line terminals thereof, each path extending through the switching network to a link circuit and back through the switching network, and at least one of these paths serving to establish connection between one of said items of auxiliary equipment and either one of the lines involved in the call or another item of auxiliary equipment.

Considering the link circuits as being at the centre of the system in relation to the communication paths that can be established between the line terminals of the switching network, the auxiliary equipments as connected to the line terminals can be considered as being at the periphery rather than being in the centre as in the more usual automatic telecommunication switching systems in which access to such equipments is obtained over branch paths leading to them from the switching networks.

In an automatic telecommunication switching system embodying this feature of the invention, the various communication paths through the switching network may be considered as being either long term communication paths, that is communication paths which provide connections maintained for the duration of a call and released on termination of the call, or short term communication paths which provide connections to auxiliary equipment that is maintained in use only temporarily during the setting up of a call.

Thus according to a second feature of the present invention, in an automatic telecommunication switching system having auxiliary equipment connected to line terminals of its switching network as aforesaid, the common control equipment of the system is operable on the occurrence of a calling condition on a line, to connect an item or items of auxiliary equipment required for the establishment of the call to the calling line by the establishment of one or more short term communication paths which extend through the switching network between line terminals which respectively give access to the calling line and to the relevant auxiliary equipment, the common control equipment being further operable upon subsequent identification of the line terminals giving access to the called line and verification that such called line is free and available, to establish through the switching network between the line terminals giving access to the calling and called lines respectively, a connection comprising at least one long term communication path, the short term communication path or paths and the auxiliary equipment or equipments being thereafter released.

A connection established for the duration of a call may involve more than one long term communication path through the switching network; for example on a call from a coin box telephone to a called line a connection may be established for the duration of the call over a first long term communication path which extends from the line terminals to which the calling coin box telephone is connected through the switching network to a link circuit and from the link circuit back through the switching network to line terminals to which one set of terminals of a coin-fee check circuit are connected, and a second long term communication path which extends from other line terminals of the switching network to which another set of terminals of the same coin-fee-check circuit are connected, through the switching network and another link circuit, and from this latter link circuit back through the switching network to line terminals to which the called line is connected. However, the main advantages of this second feature of the present invention accrue from the use of short term communication paths to establish connection of auxiliary equipments that may need to be taken into use on a call, prior to the establishment of the long term communication path.

Where a plurality of auxiliary equipments have to be brought into use for a particular call, this involving the establishment of a plurality of short term communication paths through the switching network, it can be arranged that these paths are established one after another and not concurrently, with the consequent important advantage that the common control equipment required for the control of the switching network is reduced to a minimum, because for establishing the various paths through the switching network for any particular call the same items of common control equipments, such as markers and busy/free interrogators, can be used repeatedly for the establishment of these paths in succession.

The common control equipment is also greatly simplified by the connection of the auxiliary equipment at the periphery instead of at the centre. This arises because for reasons of efficiency it is desirable that all auxiliary equipments of like type (e.g. all registers or all senders) are not subdivided into groups with restricted access to the switching network but arranged as a single large group accessible to the network as a whole. These equipment groups can be of comparable size to other groups of circuits, such as PBX line circuits or outgoing junction relay sets which are connected to the line terminals and involve selection of a free circuit from such group when such circuit is required. Thus interrogating and selecting means provided for effecting such selection can readily be adapted for effecting selection in the auxiliary equipment groups also.

Furthermore, if the switching network is arranged to provide communication paths for local traffic and junction traffic through separate switching trains, the auxiliary equipments can be connected to line terminals accessible to the junction switching trains rather than the local switching trains, without seriously affecting the grade of service provided by the switching network. This is because the grade of service provided by the junction trains would usually be made higher than that provided by the local trains coupled with the fact that, as regards the grouped items accessible to the junction trains, for example the outgoing junction groups, and auxiliary equipment groups, these trains do not have to establish connection to individual items but have a choice of selection to one of a group of items. Also, in the case of a sectionalized switching network, by making use of planar transfer circuits to provide aform of alternative routing between sections where blocking of traffic routes might otherwise occur, degradation of the grade of service provided by the switching network can be reduced to a negligible amount.

While the advantages as set out above can readily be achieved with various forms of switching network and common control equipment therefor, it is envisaged that an even more advantageous arrangement can be obtained by the use of a sectionalized switching network so devised and controlled as to permit not only the establishment of two coexisting communication paths (one short term, one long term) to the same line but also to permit both these paths to share the same switch in one or more (but not all) switching ranks. For instance, there has been proposed (*e*) modifications by which the operating and holding arrangements for the crosspoint relays of the switching arrays of a sectionalized crosspoint switching equipment (*b*), being arrangements according to a prior invention (*f*), are enabled to establish and hold two paths to the same line through the same section at the same time.

With this facility there can therefore be provided in accordance with a third feature of the present invention an automatic telecommunications switching system wherein the common control equipment is operable to establish, or to attempt to establish, through the switching network a pluarlity of separate short term communication paths of which one short term path affords connection between line terminals giving access to or towards the calling line and line terminals to which is connected one item of auxiliary equipment, such as a register, another short term path affords connection between line terminals giving access to or towards the called line and line terminals to which the same or another item of auxiliary equipment is connected, and one or more intermediate short term paths may afford connection between said one item of auxiliary equipment and such other item or between them and further intermediate items that may be required for the call, the auxiliary equipments usable with such short term paths each having two points of access to the switching network at the line terminals, and wherein also, dependent upon the called line being free and available, the common control equipment subsequently operable to establish in parallel with the short term communication paths a long term communication path between the line terminals giving access to or towards the calling and called lines whereby to establish from one side to the other of said one item of auxiliary equipment a signalling path including the said long term communication path and the several short term communication paths so that that item can verify the satisfactory establishment of the long term communication path prior to the release of the short term paths and the items of equipment which they interconnect.

Preferably this verification would be made in such a way that continuity of each of the wires of the communication paths i.e. the positive and negative speech wires as well as the private (test) and hold wires, is checked. In this way every switch involved in these paths is tested before the long term communication path is finally switched in for the call. The advantage is then obtained that the operation and correct functioning of the system is checked on every call that is established through the exchange. Further, by arranging that a register retains a record at least of the details of each communication path being established, then in the event of a fault condition being encountered. this record can be read out, for instance to a teleprinter, so that the fault can readily be traced and remedied.

In a preferred system based upon this latter concept, the function of the apparatus controlling the application of ringing current, usually provided by a transmission bridge link circuit, is removed from such transmission bridge and is performed instead by a separate ringing control circuit, selected from a group of such ringing control circuits connected to the line terminals of the switching network in the same way as previously described for other auxiliary equipments. With this arrangement it is possible to arrange that every call requiring the use of such a ringing control circuit involves a basic multiple routing through the switching network involving the establishment of four communication paths there-through, namely three serially connected short term communication paths of which the first connects the calling line to a register, the second connects the register to a ringing control circuit, and the third connects the ringing control circuit to the called line, and an overlying or parallel-connected long term communication path connecting the calling and called lines directly. For calls which do not require the use of a ringing control circuit, for example calls to an outgoing junction, the same basic routing of the short term paths may be established with the ringing control cricuit replaced by another item of short holding time equipment such as a sender for dealing with different types of signalling that may be required over the outgoing junction. However, if such sending equipment is included in the register equipment the basic multiple routing for an outgoing junction call may involve, in addition to the long term path, the establishment of only two short term paths, one extending from the calling line terminals of the switching network to one side of the register-sender equipment and the other extending from the called line terminals to the other side of the register-sender.

Again, in the preferred system referred to above it may be desirable for the release of the short term paths to be effected at different times. For example, in the case of a local call for which a ringing control circuit is employed, it is desirable to effect release of the register equipment as soon as possible upon the successful completion of its testing and verification function, and for this reason the system may be arranged so that upon the successful verification and testing of the established connection, only the first two short term paths i.e. those connecting the register, are released whereas the third short term path connecting the ringing control circuit is maintained until the ringing signal sent by this circuit to the called line, is terminated by the called subscriber answering, whereupon the third short term path can also be released.

Preferably it is also arranged that in the event of the register equipment failing to verify the correct completion of some part of the overall connection the register may cause the clearing down of at least part of the connection already set up and make a further attempt to set the connection from itself or some other verified point ahead. If after a given number of such attempts to complete a connection the register is still unable to correctly establish the call, it can be arranged that the register will cause busy tone to be sent to the calling line and at the same time pass all information stored within itself to the common control for read-out to a teleprinter or other recorder.

As mentioned previously, if the switching network of an automatic telecommunication switching system according to the invention is arranged to provide communication paths for local traffic and for junction traffic through separate switching trains, the auxiliary equipments can be connected to line terminals which have access to the junction switching trains rather than the local switching trains.

By way of example, the invention will be further described with reference to the accompanying drawings in relation to a system in which the switching network has separate switching trains, referred to herein as "local" and "trunk" respectively. The term "trunk" is used in relation to circuits or circuit groups which have a relatively high usage as compared with local line circuits and for which less concentration of traffic through the associated (trunk) switching trains is acceptable. In the system to be described local lines are connected to line terminals having access to the local switching trains and auxiliary (peripheral) equipments are connected to line terminals having access to the trunk switching trains. Incoming and outgoing junction lines are usually high usage circuits and would therefore usually be connected to line terminals with access to the trunk switching trains; dependent on traffic levels however, they could if desired be connected to line terminals with access to the local switching trains. PBX lines, although grouped and therefore in this respect similar to outgoing junction and auxiliary equipment groups, would usually be connected to line terminals with access to the local switching trains, but here again this is not obligatory and would depend on traffic levels.

In the accompanying drawings, FIGS. 1*a* and 1*b* illustrate a switching network, in abbreviated form, for such a system, together with a block schematic representation of the lines and auxiliary equipments connected to the network and of the basic units of control equipment for the network;

Figure 14:
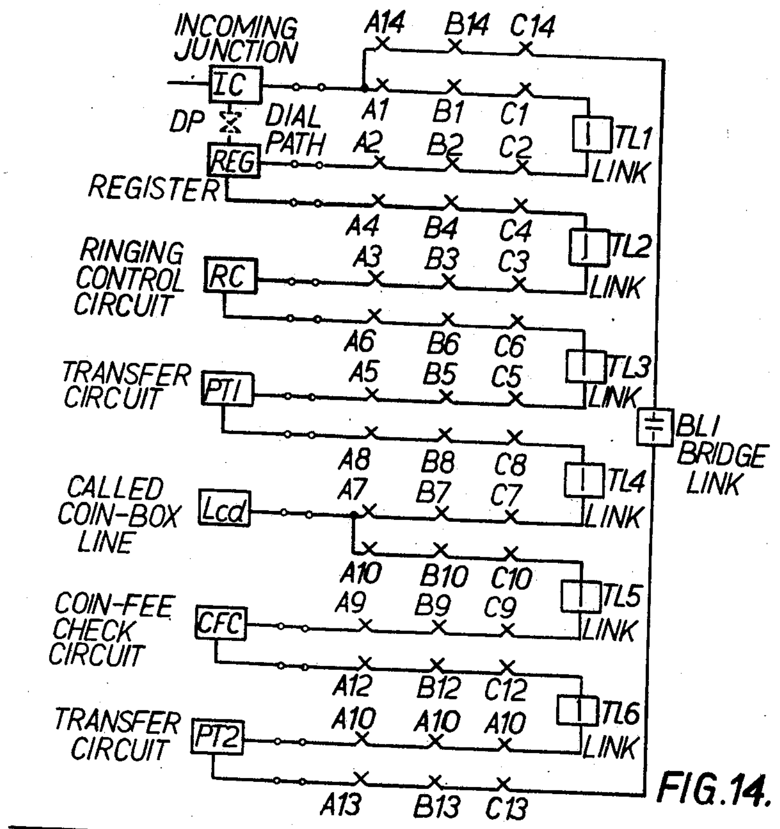
Figure 15:
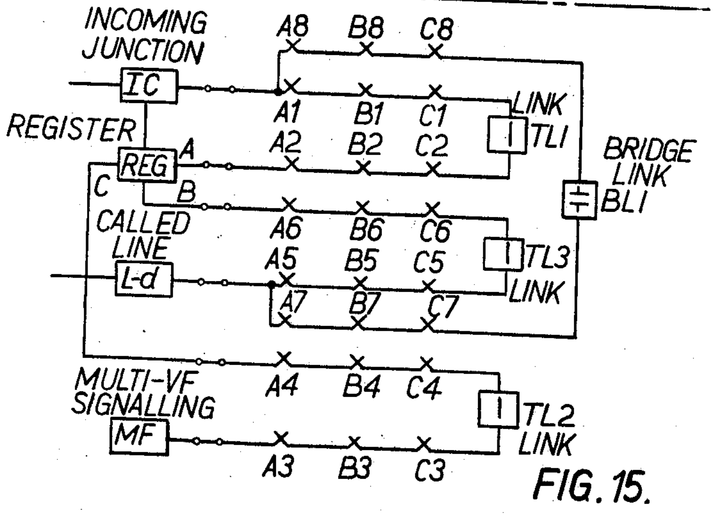
Figure 16:
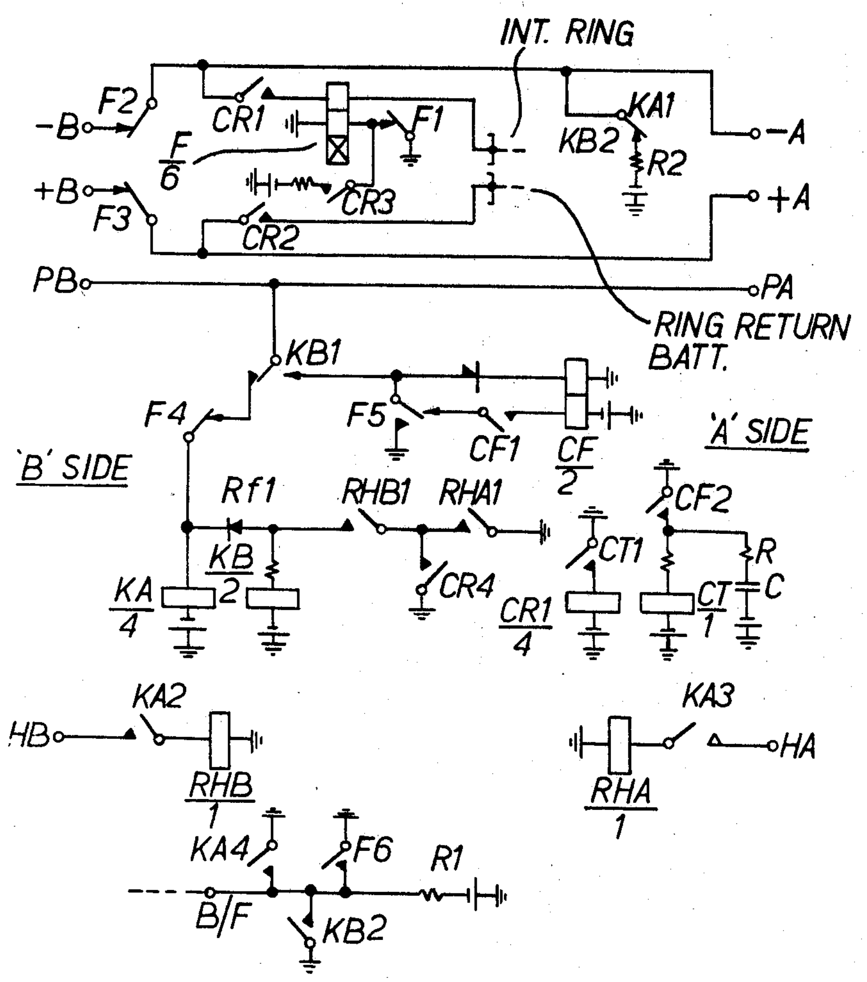
Figure 17:
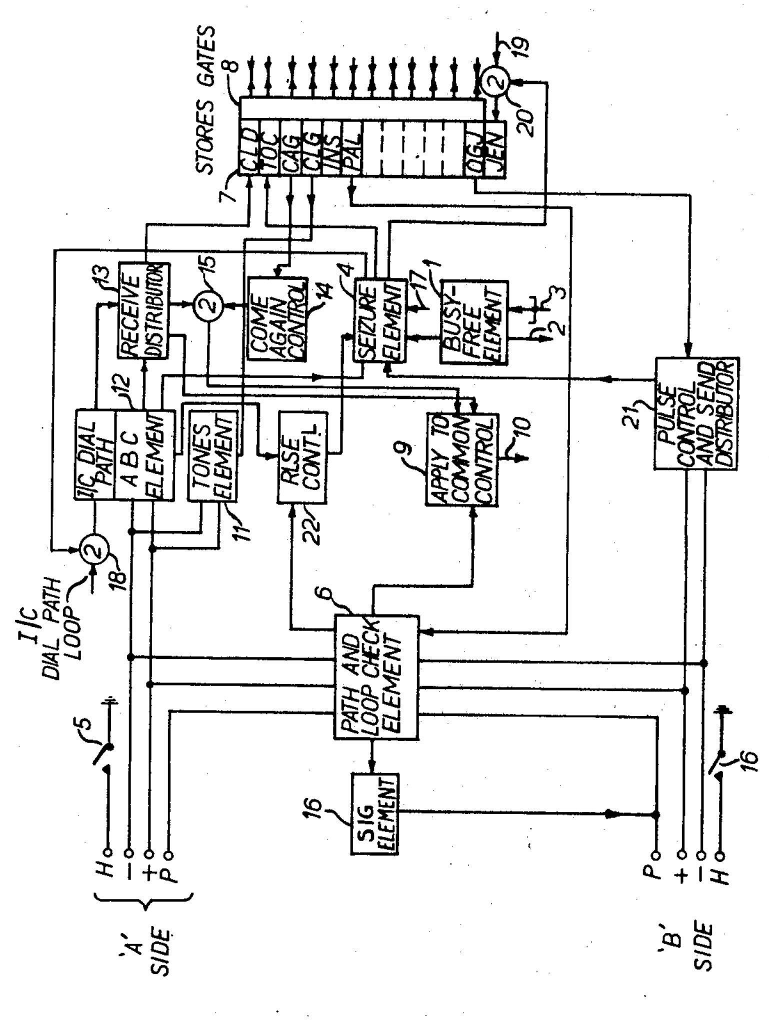
Figure 18:
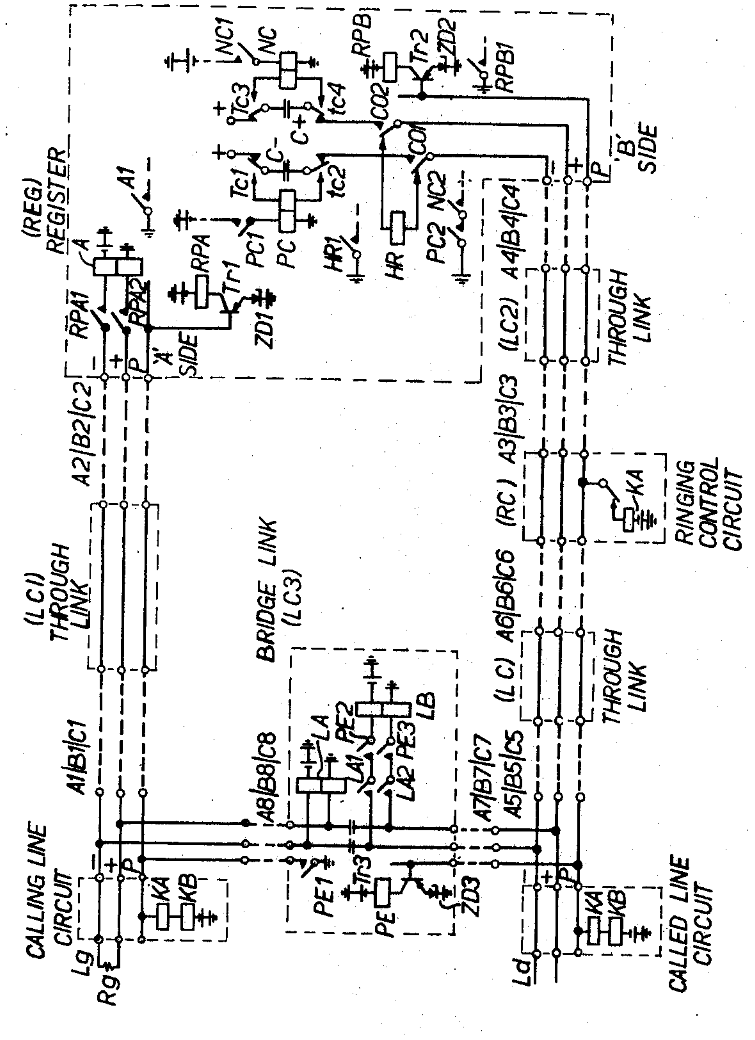

Also, in the accompanying drawings, FIGS. 7 to 15 are respective further trunking plots relating to typical sequences of communication that may be established for calls through the switching network of a system according to the invention; and FIGS. 16 to 18 show exemplary circuit details of auxiliary and common control equipment for a system according to the invention.

Figure 1A:
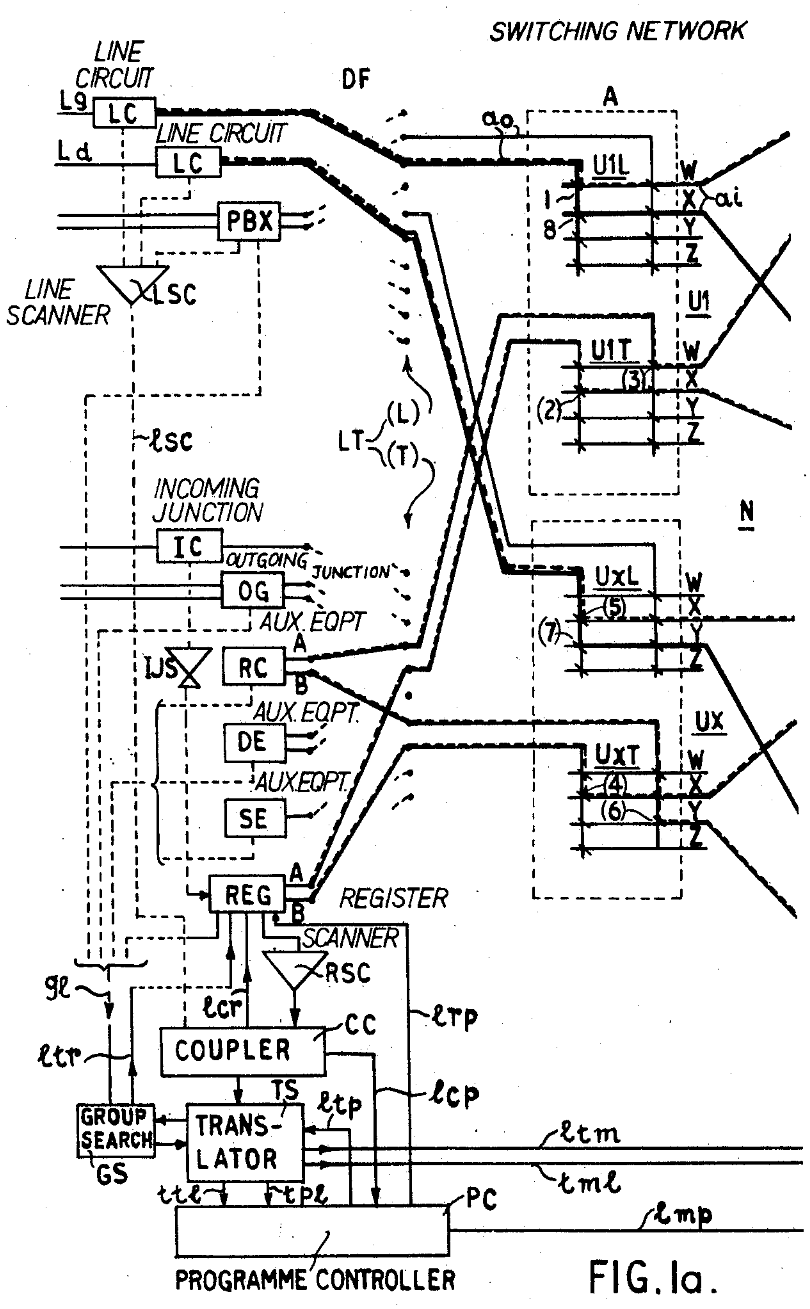
Figure 1B:
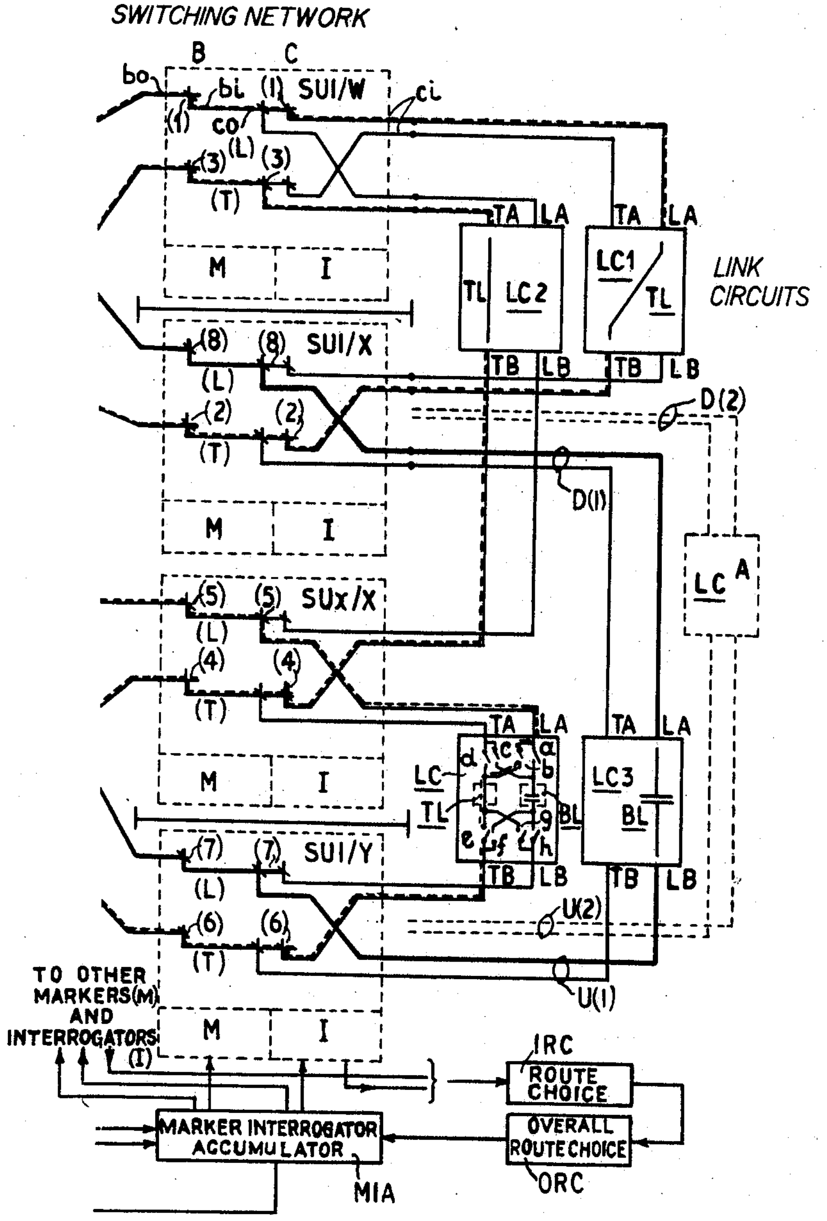

Referring to FIG. 1, a switching network N constituted by three co-ordinate switching stages A, B and C affords selective connection between line terminals LT at one side of the network and a plurality of link circuits such as LC at the other side. As regards the connections afforded between the line terminals and link circuits the network is organized in the same manner as the network described in bibliographical references (*b*) and (*c*). The network is in four separate sections W, X, Y and Z.

In each section each of the stages comprises a number of co-ordinate (cross-point) switching arrays which will be termed the B and C switches respectively. Each B switch and each C switch (and also each A switch as will be considered later) is constituted in the usual manner by two co-ordinate sets of connections with switchable interconnecting devices, for example reed relays, at each cross-point. Each such connection is shown only as a single line in FIG. 1 but is of course, constituted by a plurality of individual conductors and associated switching devices at each cross-point; these individual conductors correspond to, and when taken into service a call form part of, the usual communication wire and test wire connections (+, — and P) and any associated control connection or connections that are established through the network for the call. Assuming that these through-connections will be established under the control of a marker which functions by causing sequential operation of the relevant cross-point switching devices in the three stages C, B and A in that order, i.e. from the link circuits towards the line terminals, the set of connections on the link circuit side of each of the A, B and C switches will be termed the switch inlets, while those on the line terminal side will be termed the switch outlets.

In each of the switching sections (W, X, Y, Z) of the B and C stages, the B and C switches are further subdivided into sub-units. In FIG. 1 only two sub-units SU1/X and SU*x*/X of section X and only one sub-unit (SU1/W, SU1/Y) from each of sections W and Y have been represented. Each sub-unit has a "local" group (L) of B and C switches and a "trunk" group (T) thereof. In each group each B switch has a number of inlets equal to the number of C switches in the group and these inlets are connected to respective C switch outlets which have the same ordinal position in the several C switches. The number of outlets on each C switch likewise equals the number of B switches in the group. In each sub-unit, each pair of C switch inlets, namely inlets having the same ordinal position in corresponding C switches in the local and trunk groups respectively, is connected to a pair of terminal connections at one side of a link circuit such as LC. The link circuits, which are of compound form, (*c*) provide between such a pair of terminal connections LA and TA at one side and a pair LB and TB at the other side a bridge-link sub-circuit BL (which includes a supervisory transmission bridge) and a "through"-link sub-circuit (which provides a through-connection without such bridge). By the selective operation of switches symbolised at *a*—*h*, connection can be established from either terminal connection at one side to either terminal connection at the other side through either the bridge-link sub-circuit BL or the through-link sub-circuit TL. This is shown by the following table:

| | Link sub-circuit | Switches operated |
|---|---|---|
| Connection between: | | |
| LA and LB | BL | a+h |
| LA and LB | TL | b+g |
| LA and TB | BL | a+f |
| LA and TB | TL | b+e |
| TA and LB | BL | c+h |
| TA and LB | TL | d+g |
| TA and TB | BL | c+f |
| TA and TB | TL | d+e |

The sub-circuits, and therefore the link circuits themselves, are reversible and can therefore be taken into use for transmission through them in either direction. The detailed organization and mode of operation of the link circuits are not directly concerned in the present invention and therefore need not be further particularised.

It is to be noted that only link circuits such as LC are connected to the C switch inlets.

These link circuits are provided in such number and connected to the C switch inlets in such an overall arrangement that each sub-unit of each section is linked to the several sub-units of the next section (taking the sections in cyclic order W, X, Y, Z, W) through respective groups of link circuits connected between the C switch inlets of the sub-units. The link circuits of the group between any two sub-units in adjacent sections are connected to C switch inlets having corresponding ordinal positions in respective C switches in each sub-unit, there being the same number of C switch pairs (local and trunk) per sub-unit as there are link circuits in a group. The number of C switch inlets per C switch corresponds to the number of link circuit groups connected to each sub-unit, being at least twice the number of sub-units per section because each sub-unit is linked not only to each sub-unit in the next section but also from each sub-unit in the preceding section. In FIG. 1 only a single path or route is shown through the B stage of the local and trunk switching trains L and T in each of the sub-units SU1/W, SU1/X, SU*x*/X, SU1/Y, (being a route establishable over B switch inlet and outlets such as *bi* and *bo* and a C switch outlet such as *co*) and only two C switch inlets such as *ci*. Also only four link circuits such as LC connected to the C switch inlets are shown, being link circuits which link sub-unit SU1/W with SU1/X (LC1) and SU*x*/X (LC2), and these last two sub-units with SU1/Y (LC3 and LC respectively). In order to increase the provision of link circuits between sub-units in adjacent sections, additional C switch inlets may be provided to enable at least one other group of link circuits to be provided between sub-units and thereby afford at least two link group paths between them. Such duplicate paths, when provided, will be referred to hereinafter as path 1 and path 2. A link circuit of an additional group between sub-units SU1/X and SU1/Y has been represented at $LC_A$ in FIG. 1. Additional link circuits providing through links only may also be provided between the sections.

The A stage switching arrays are sub-divided into a number of units such as U1, U*x* equal to the number of sub-units in each section of the B and C stages. Each A stage unit has a number "local" co-ordinate switches such as U1L, U*x*L and a number of "trunk" switches such as U1T, U*x*T. Each of these A stage switches has a nummber of inlets, such as *ai*, which are respectively connected to different B and C stage switching sections as denoted by the letters W, X, Y, Z appended to them: in particular, thesee inlets are connected in the pertinent sections to respective B switch outlets (such as *bo*) of respective B switches which correspond to each other as regards their ordinal position in their respective sub-units but may or may not be in corresponding sub-units in the several sections. (This last statement has reference to the possibility of division into "P" and "Q" lines of the lines connected to a sectionalized cross-point switching network (*b*).

In each A stage "local" unit such as U1L, and likewise in each "trunk" unit such as U1T, the constituent A switches are sub-divided into a number of groups equal to the number of local (or trunk) B switches in a sub-unit such as SU1/W. The outlets such as *bo* of each B switch are respectively connected to the relevant inputs of the A switches which constitute a particular group, those outlets which have the same ordinal position in the several B switches being connected to inlets of respective A switches which have the same ordinal position in their respective groups. The outlets such as *ao* of the A switches are individually connected to the line terminals LT, which are divided into "local" line terminals LT(L), to which the outlets from the "local" A switches such as U1L are connected, and "trunk" line terminals LT(T) to which the outlets from the "trunk" A switches such as U1T are connected. Only two outlets are shown for each of the A switches represented: these are merely typical of some greater number, which for example could conveniently be ten outlets per A switch.

Individually connected to respective "local" line terminals LT(L) over a distribution frame DF are the local lines served by the exchange, namely ordinary subscribers' lines such as L*g* and L*d* with line circuits LC, and the lines of private branch exchange groups such as PBX. The lines of a PBX group are preferably connected via the distribution frame DF and line terminals LT(L) to the outlets of an A switch or switches exclusively serving such PBX groups. However it will be appreciated that each line, whether ordinary or PBX can be identified in terms of the particular A switch outlet to which it is connected at the line terminals LT, this identification being divorced from the directory number of the line by, but being derivable therefrom according to the interconnections made on, the distribution frame DF.

Connected to some of the "trunk" line terminals LT(T) over the distribution frame DF are individual incoming junction line circuits such as IC and the lines of outgoing junction groups such as OG. To the other "trunk" line terminals LT(T) are connected groups of auxiliary equipment of various kinds including a register group REG. Also represented is a group of ringing control circuits RC. Other kinds of auxiliary equipment that may be provided in similar groups are, for instance, tone circuits to which connection would be established for providing busy or N.U. tone when required, and planar, or section, transfer circuits (*d*) which can be brought into use when required for the purpose referred to earlier in the specification. Equipments which are intended for connection in series with an established communication path, whether it be a long-term path held for the duration of a call or a short term path established only temporarily during the setting up of the call, are provided with two sets of terminal connections (hereinafter termed the A-side and B-side connections) to the line terminals LT(T). In this respect such equipments can be considered as "double-ended": it is also possible to design them for "both-ways" operation. The registers and ringing control circuits are such equipments and their A- and B-side connections are typified by two correspondingly labelled connections extending from the boxes which represent the groups of these equipments in FIG. 1. Another box DE represents other groups of miscellaneous double-ended equipments, which would include, for instance, the planar transfer circuits already referred to. Equipments which are intended for connection only at an end of a communication path require only a single set of terminal connections and in this respect are single-ended. Groups of such single-ended equipments are represented in FIG. 1 by the box SE and would include for instance, the tone circuits already mentioned. Each auxiliary equipment group, and also each outgoing junction group, has allocated to it an identification number (hereinafter referred to as its "equipment group number") constituted for instance by two decimal digits.

Figure 2:
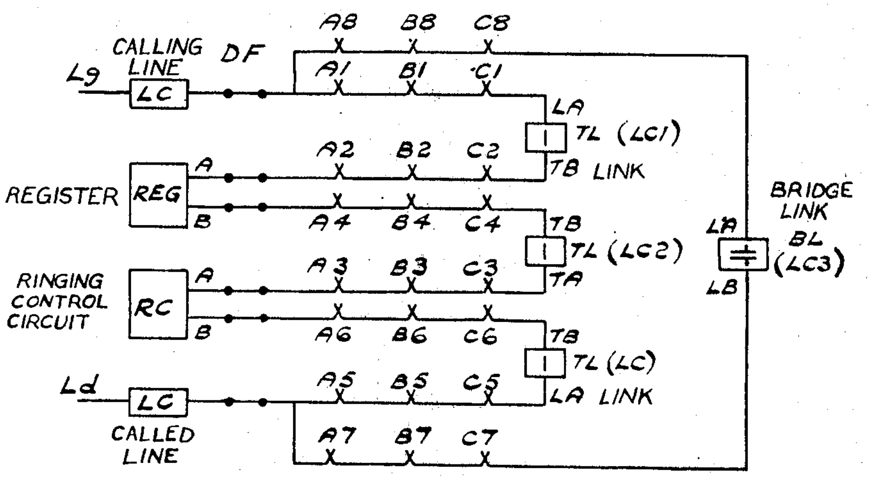
FIG. 2 is a trunking plot relating to a typical sequence of communication that may be established through the switching network for a call between two ordinary subscribers lines.

Before going on to consider the control equipment it is believed expedient to describe briefly a typical combination of communication paths that may be established through the switching network and link circuits in the setting up of a call between, for instance, the lines L*g* (calling) and L*d* (called), the latter being assumed free. The short-term paths are traced through the network and link circuits in interrupted heavy lines, and a final, long-term, path established between the lines is traced in uninterrupted heavy lines. In FIG. 2 these several paths have been extracted to show their relationship in a more easily understandable layout. The cross-points involved are lettered according to the switching stages in which they lie and numbered according to the order in which the various path portions between the line terminals and link circuits are established: that is, the first path portion to be established is that involving cross-points A1, B1, C1, the second path portion is that involving cross-points A2, B2, C2, and so on. In FIG. 1 the cross-points involved have been similarly numbered to facilitate tracing the paths through the network.

Referring therefore to FIGS. 1 and 2, the calling line L*g* is first connected to the A-side connection of one of the registers REG over a communication path established through cross-points A1, B1, C1, terminal connections LA and TB of link circuit LC1 via the through-link (TL) of this link circuit, and cross-points C2, B2, A2. After receipt and registration of the called line's identity from the calling line over this path, connection is established between the B-side connection of the register and the A-side connection of one of the ringing control circuits RC over a second path established through cross-points A4, B4, C4, terminal connections TB and TA of link circuit LC2 through the through-link (TL) of this link circuit, and cross-points C3, B3, A3. Provision is made in the register for checking that this path is properly established, whereafter the B-side of the ringing control circuit is connected to the called line L*d* over a third path established through cross-points A6, B6, C6, terminal connections TB and LA of link circuit LC via the through link (TL) therein, and cross-points C5, B5, A5. Again the register checks that this third path is properly established, being able to do so via the second (register to ringing control circuit) path which is still in being. Interconnection between the calling and called lines is now established in similar manner over a path through cross-points A8, B8, C8, terminal connections LA and LB of link circuit LC3 via the bridge link (BL) therein, and cross-points C7, B7, A7. While the previously established paths are still in being, the register checks continuity of the connections that should now exist from its A- and B-sides to the opposite sides, respectively, of the bridge link in link circuit LC3. The ringing control circuit now applies ringing current to the called line L*d*, and the first two (short-term) paths can then be released, leaving the lines L*g* and L*d* connected over the path through the bridge link, in which supervision of the call is now vested. On the called subscriber answering the ringing control circuit trips and the path to it is released.

It will be appreciated that part of the function of the control equipment associated with the switching network is to determine which of the link circuits are suitable and free for inclusion in each communication path to be established and to select one of them for inclusion if there are more than one. In FIG. 1 various parts of the control equipment performing particular functions therein are represented in block form and are shown interconnected by dotted, arrow-headed lines which represent signalling highways between these various parts. Each such highway comprises a number of individual connections dependent on the number and nature of the signals to be transmitted over it: for instance a start signal could be transmitted on a single connection, whereas for the simultaneous transmission of a group of numerical digits the relevant highway can include, for each such digit, a set of connections arranged to be marked in some suitable code (e.g. two-out-of-five code for a decimal digit) according to the digit value to be transmitted.

Referring to FIG. 1, the local subscribers' lines connected to the exchange (both ordinary and BPX) are recurrently scanned by a line scanner LSC which on detecting a calling line stops its scanning action and transmits towards a common control coupling unit CC over highway *lsc,* an "ask" or request signal, a "calling subscriber" staging signal (such staging signals having the function of indicating the particular stage that has been reached in the setting up of a call), and the directory number of the calling line determined in the terms of setting of the line scanner. For this purpose the line scanner may take the form described in the specification of bibliographical reference (*b*) with reference to FIG. 6 thereof, with the "calling subscriber" signal derived from the request signal. It will be appreciated that instead of the line scanner LSC there can be used any other form of calling line detector which is able to produce such a request signal accompanied by a digital identification of the calling line. There may be a plurality of line scanners or other calling line detectors each serving only a proportion of the lines: for example, one to each 1000 lines. In this event a detected calling line will be identified also in terms of the particular line detector serving it.

In response to an "ask" signal, the common control coupler CC accepts and stores the calling line identity and "calling subscriber" staging signal as presented to it over highway *lsc*. It then passes this staging signal over highway *lcp* to a programme controller PC the function of which is to determine and control the subsequent actions of the control equipment depending on the particular stage reached in a call, the conditions encountered in the previous stages and the connections required to be established in the next stage. For this purpose the programme controller has "written" into it, for example by selective strapping between different combinations of input and output gates, a predetermined sequence of subsequent action for each combination of existing and occurring circumstances that may normally arise.

In response to the "calling subscriber" signal (indicating that a line scanner which has detected a calling condition has been coupled to the common control), the programme controller returns an instruction signal over highway *ltp* to a translator unit TS which accepts the calling line's director number from the common control coupler CC for translation into an appropriate "connection number" which relates the line to the particular line terminal LT to which it is connected over the distribution frame DF. This translation is stored in the translator which also provides a signal indicative of the class of service of the calling line. This latter signal is passed over highway *tpl* from the translator to the programme controller PC. Depending on the class of service thus signalled and in conjunction with the calling subscriber staging signal the programme controller determines the kind of auxiliary equipment which is required to be connected with the calling line, doing so in terms of the equipment group number: in the case of an ordinary subscriber a register will initially be required, whereas in the case of a coin box subscriber the initial requirement may be a coin fee check circuit. Assuming that a register is required the programme controller passes an instruction signal over highway *lmp* to a unit MIA called the marker interrogator accumulator and causes this to accept and store the connection number of the calling line as presented to it from the translator over highway *ltm*. When the marker interrogator accumulator MIA has stored this information it passes a "storage complete" signal over highway *lmp* to the programme controller PC, which in response thereto passes a further signal over highway *ltp* to the translator to clear the stores therein. It then passes the register group equipment number into the translator accompanied by an "accept" signal which inidicates to the translator that search for a free register is required. The translator passes the register group identity into a group search unit GS the function of which is to select a free item of equipment from any equipment group identified to it. To this end the free/busy conditions of the equipment in each group are signalled to it over highway *gl* and a selection is made in the appropriate group, for instance in the manner described bibliographical reference (*g*) with regard to selection of free line from a PBX group.

Assuming a free register to be available, the number of that register in its group and the group number are passed by the group search unit to the translator, which provides a translation giving the connection number of the selected register. The translator stores this information and passes a signal to the programme controller PC over highway *ttl* to indicate that this information is available. Upon receipt of this signal the programme controller passes an instruction signal to the marker interrogator accumulator MIA over highway *lmp* causing it to accept the connection number of the selected register from the translator over highway *tml,* and one to the registers over highway *lrp* to render them responsive to receipt of the selected register's identity from the group search unit GS over highway *ltr*. The selected register responds uniquely to this receipt of its own identity and accepts it as a seizure signal to which it responds by applying a busying condition to itself pending establishment of a through condition to the calling line and by accepting the calling line identity from the common control coupler CC over highway *lcr*. Further instruction signals are passed by the programme controller over highway *ltp* to clear down the translator and group search units, and over highway *lmp* to instruct the marker interrogator accumulator MIA, now storing both the calling line connection number and the register connection number to initiate determination and selection of a free path available between the calling line and the selected register through the switching network. The marker interrogator accumulator MIA determines which B and C rank sub-units are accessible to the calling line and the register and feeds requisite information to interrogators I associated individually with these sub-units, all of the sub-units having such interrogators I and also having markers M.

The interrogators determine which suitable routes through the switching network are available and supply this information to an inter-section route choice unit IRC which determines which suitable link circuits are available for linking these routes into complete communication paths between the relevant line terminals. This information is then passed to an overall route choice unit ORC which effects selection of the best path available through the switching network. This interrogating and selecting operation is substantially as described in bibliographical reference (*b*). After a path has been chosen, the marker interrogator accumulator MIA seizes the two appropriate markers M (each switching sub-unit also having its own marker in addition to its own interrogator) and passes route setting information appropriate to the chosen path into these markers. When the marker interrogator accumulator MIA has completed its function it passes a signal indicating this to the programme control equipment which thereupon continues its related cycle, which in this instance will result in the clear down of the common control and resumption by the common control coupler. Upon receipt of the setting information the markers proceed to set up the routes, for instance substantially in the manner described in bibliographical reference (*b*), and thereby complete a through-connection between the calling line and the selected register. The establishment of this first (short-term) path results in removal of the calling condition from the calling line circuit. This is detected in, and as a consequence frees, the line scanner LSC, which can thus also effectively check the successful establishment of the path and may, if desired, provide a fault signal in the event of failure. The calling line is now provided with dial tone from the register and the register is busied from the calling line loop. The subscriber now proceeds to signal the digits indicative of the wanted line. Upon receipt of the first digit or significant group of digits the register applies an "ask" signal to the common control coupler CC, which is response thereto accepts from the register the information already stored therein (which at this stage comprises the registered group number, the number of the register within the group the calling line directory number and the first digit or digit group signalled by the calling subscriber) together with a "calling register" staging signal. The common control coupler CC passes the staging signal on to the programme control circuit which thereupon returns a signal to the translater causing it to accept the first digit from the common control coupler and ascertain if it signifies a local call or trunk call. In the present case, since the call is a local one, the translator responds to the first digit by passing a "local call" signal to the programme controller which now passes a signal to the register to indicate that it has been taken into use on a local call and should re-apply after further digits have been received. The register now awaits the arrival of the remainder of the called line's identification digits and when these have been received the register again applies the "ask" signal to the common control coupler. This time the coupler accepts from the register the calling line directory number, the called line directory number, the register group number and the register identity within that group, together with a staging signal indicating a calling register with complete called subscriber identity. This staging signal is passed to the programme controller, which responds by passing an instruction signal to the translator to accept the called line's identity from the common control coupler. The translator recognises the information as pertaining to a local call and provides the connection number of the called line (not used at this stage) together with the class of service of this line. The programme control receives the class of service signal and responds by clearing the translator and passing to it the equipment group number constituting a request for translation of the ringing control circuits. As described in connection with the register, the group search equipment GS now proceeds to select a free ringing control circuit RC the identity of which is passed into the register and also into the translator as previously described for the selected register. The translator provides the connection number corresponding to the selected ringing control circuit and this is passed into the maker interrogator accumulator MIA over highway *tml*. Completion of the action is signalled and the programme control again clears the translator and group search equipment of all stored information in readiness forthe next stage.

The situtation now is that the register is connected to the calling line over its A side terminal connection to the switching network and it is now necessary to effect a connection from its B side to the A side of the selected ringing control circuit RC. For this purpose it is necessary to obtain the connection number corresponding to the B side of the register.

The programme controller therefore now instructs the translator to accept the register identity from the common control coupler by a signal which, by virtue for instance of the particular lead in the highway *lcp* over which it is passed, causes the translator to provide the B side connection number of that register. The programme controller then instructs the marker interrogator MIA to accept the register B side connection number from the translator, and upon completion of this action instructs the translator to be cleared. The marker interrogator accumulator MIA in conjunction with the relevant markers M and interrogators I now control the selection and establishment of a through connection between the register and the chosen ringing control circuit, the common control being released upon completion of the selection. The marker which effects connection between the ringing control circuit and the first stage of the switching network, is arranged to test that the ringing control circuit is still free and, if it is, applies a seizing signal to it which causes this ringing control circuit to be marked busy to the group search unit GS.

The position now is that two short term communication paths have been set up, one from the calling line to the A side of the register and another from the B side of the register to the A side of the ringing control circuit, both these connections involving through link circuits in the switching network. On establishment of the connection between the calling line and the register, a (negative) battery signal passed from the calling line circuit over this connection to the register indicates to the register that it is connected to the calling line circuit and causes normal supervision to become vested in the register. Similarly, on completion of the connection between the register and the ringing control circuit, a signal applied by the ringing control circuit to the connection, e.g. to the P-wire thereof indicates to the register that it is connected to the ringing control circuit and can now re-apply its "ask" signal as a request to the common control for the next stage in the setting up of the call. Following response to this signal, the common control coupler CC accepts from the register, its information comprising the calling directory number, the called directory number, the register group identity and number within that group, and the ringing control circuit group identity and number within the group, together with a "called subscriber" staging signal. Upon receipt of this staging signal, the programme controller instructs the translator to accept the called line's directory number, from which it provides the connection number of the called line together with its class of service; this latter item of information is not used at this stage of the call. The programme controller instructs the marker interrogator accumulator MIA to accept the connection number of the called line, then clears the translator and instructs it to accept the ringing control circuit identity from the common control coupler and provide the B side connection number of that circuit. This is passed as before to the marker interrogator accumulator MIA which again as before, controls the selection of a through path for establishment between the B side of the ringing control circuit and the called line.

To enable the register to recognise that this connection has been established to the called line, it can be arranged that an earth signal which the markers apply to the P wire of the connection prior to their release from the connection causes the ringing control circuit to remove the battery, signal which it had previously applied to the P wire of the connection between itself and the register and to repeat the earth signal to the register. This earth signal conditions the register to accept over the completed connection as an indication of the completion of the path, a further (negative) battery signal applied to the connection at the called line circuit.

Assuming that the called line tests free, the register can now apply to the common control for the establishment of a long-term connection between the calling and called lines. This time the calling directory number and called directory number together with a "final connection" staging signal is passed into the common control coupler, and this passes a corresponding instruction signal to the programme controller. The programme controller instructs the translator to accept the called directory number and provide the connection number and class of service instructions. The marker interrogator accumulator MIA is caused to accept this connection number as before. The programme controller then clears the translator and instructs it to accept the calling directory number and provide the calling connection number to the marker interrogator accumulator, which then controls selection of a path for the required connection as before. The register checks the arrival of the calling side of the connection and also checks all the wires of the path to the called line via the ringing control circuit. If the checks are satisfactory, the register passes a signal to the ringing control circuit instructing it to commence ringing of the subscriber's line. (It may be noted here that signalling between various equipments over a communication path established between them—as in the instant case of signalling between register and ringing control circuit—may be effected by application of different potential or loop conditions to such of the wires constituting these paths as are not otherwise in use at the time. This basic signalling technique is of course well known and can be readily adapted and extended for the present purposes.) The register now releases itself together with the short-term paths between calling line and register and between ringing control circuit and register. This leaves the long-term path containing the bridge link between calling and called lines and a temporary path between ringing control circuit and called line. When the called line answers the ringing control circuit trips the ringing in a basically conventional manner, passes a signal to the bridge link indicating that the called line has answered, and releases itself and the temporary path between it and the called line. During ringing, ringing tone can be provided to the calling line from the transmission bridge circuit in the long term path, again in basically conventional manner.

In the event of the called line having tested busy when the third short-term path was established, a busy signal passed back to the register may cause it to re-apply to the common control circuit CC with the same information as for a free line but with a "line busy" staging signal. This latter signal is passed to the programme controller, which in the same manner as before controls the selection of a free tone circuit by the translator and the establishment of a communication path between it and the calling line, to which busy tone is then reverted by the tone circuit. The register and ringing control circuit and the other connections established can then be released.

It is believed that the foregoing description gives an adequate explanation of the manner in which the programme controller PC, acting in response to particular staging signals received via the common control coupler CC and in conjunction with a register taken into use for a call, controls the establisment of successive communication paths through the switching network and link circuits to appropriate items of auxiliary equipment and eventually between the calling and called lines themselves. The action will be basically similar whenever the staging signal may dictate the taking into use of some other provided form of auxiliary equipment. Moreover in the case of an outgoing junction call or a call to a PBX line, the translator TS and group search unit GS will collaborate in the same manner as for the auxiliary equipment groups in selecting a particular free outgoing junction line or PBX line from its group and signalling its identity to the programme controller and register. In the case of incoming junction lines it is contemplated to provide for these lines a scanning equipment IJS which on detection of a calling condition on such line acts to seize a free register and thereafter pass the incoming digit signals directly into this register. Such arrangements are described in bibliographical references (*h*) and (*j*). After receipt of the first digit the register may, and preferably does, produce its "ask" signal and an appropriate staging signal in response to which a communication path will be established through the switching network to the calling junction in basically the same manner as before, the establishment of this path permitting the register to perform the same path checking functions as before. The register can receive subsequent digits over this path permitting the scanning equipment to be released.

The programme controller may be constituted and operate in accordance with known techniques of digital processing such as are now widely used in the computer and automation fields. In particular the programme controller may be constituted by logically interconnected logic gates associated with timing or sequencing elements determining the timing between, or the order of performance of, successive actions controlled thereby. In the present state of the art it is unnecessary to describe such a programme controller in detail. There follows, however, a brief description with reference to FIG. 3 of the basic organisation of a form of programme controller, especially suitable for the present purposes, which is based on the so-called code-point type of translator.

Figure 3:
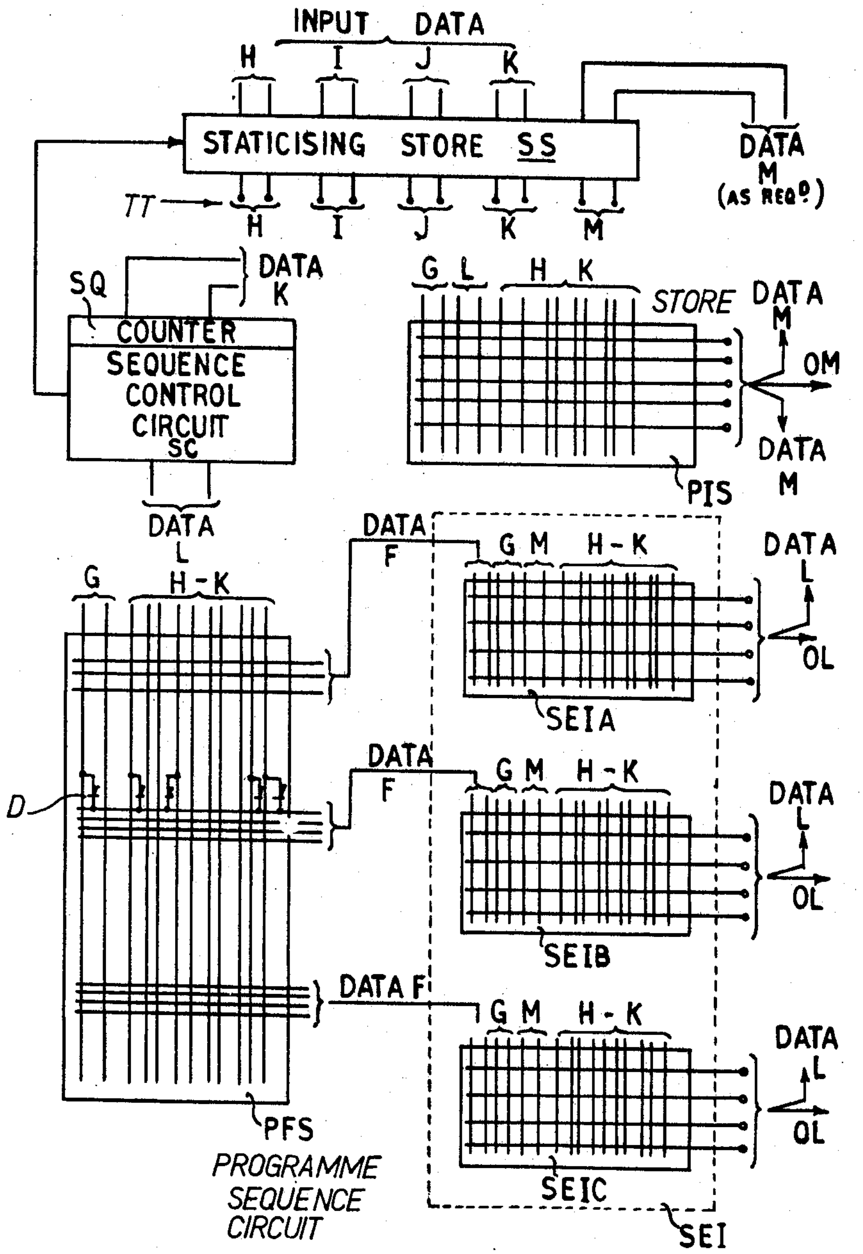
FIG. 3 is a schematic representation of a programme controller illustrating the basic units thereof and indicating the inter-connections between them.

A code point translator is basically an assembly of coincidence gates having their inputs connected to be actuated by signals appearing on specific input information highways so that the appearance of an output from any gate is indicative of the presence of a particular combination of signals received over the information highways: the output from each gate controls a requisite number of circuits (for instance functional units or other gates) which themselves control or determine the functions required to be performed in response to the received information. Timing or sequencing of the performance of such functions is achieved by the provision of additional, timing, inputs to the gates where required. With a large amount of input information to be processed and with a large number of different "programmes" to be provided for, the use of a single code point translator would tend to be wasteful of gates and to require unduly large structural units. In FIG. 3, therefore, the programme controller is built up from a number of smaller translating units which can readily be adapted or expanded to cater for any number of programmes of differing diversity and extent.

It is contemplated to use for the programme controller a form of code-point translator, such as the modular form described in bibliographical reference (*k*), in which there is provided two orthogonally orientated sets of connections of which those of one set, being respectively connected to input leads on which the signal combinations representing information to be translated will appear, are selectively connected through gating diodes to particular ones of the other set of connections according to particular combinations of input signals to which these latter connections respectively relate as code points. In FIG. 3 such a translator is represented by a rectangle such as PFS with sets of vertical and horizontal lines representing respectively the two sets of connections. In the rectangle PFS a number of diodes connecting a particular combination of vertical (input) connections to a particular horizontal (output) connection are shown at D for a typical code point.

Referring to FIG. 3 the programme controller there represented comprises an information staticising store SS a sequence control circuit SC including a counter SQ, a first code point translating unit PIS constituting a programme instruction store, and a two-stage arrangement of further code point translators together forming a programme sequence circuit, the first stage being a code point translator PFS (termed the programme family selector) while the second stage SEI (termed the sequence event identity circuit) includes a number of small code point translating units of which three designated SEIA, SEIB and SEIC, are shown as typical.

Information fed into the programme controller from external units such as the translator TS and coupler CC in FIG. 1 consists of various items designated Data H, Data I, Data J, Data K in FIG. 3. In addition, other information indicated as Data F, Data G, Data L, Data M and Data N is generated within the programme controller itself.

Of the input information, Data H constitutes all information which is fed to the programme controller from the line scanner and register equipments at the start of a programme of action. For example, in the case of a local subscriber initiating a call, this information could comprise two signal codes, one of which would indicate that a calling line circuit has been coupled by the common control coupler CC, while the other would indicate that the calling line circuit pertains to a local line on which a call has been initiated but not yet responded to. At other stages in the establishment of a call different Data H information would be supplied, and there may be more than two items of information, for example, a first signal code may indicate that a register has been coupled by the common control, a second could be a staging signal previously sent to the register to prepare it to expect connection to, say, a ringing control circuit and now returned by the register while a third might indicate that the ringing control circuit was busy when tested (although it had been free when selected).

Data I comprises other information sent to the programme controller by functional units during the processing of a call. It is a feature of the system being described that the programme controller and functional units such as the registers and marker interrogator accumulator MIA "communicate" with one another during the carrying out of a programme of operations, i.e. the programme controller may instruct a functional unit to process a particular item or items of information or carry out a particular operation and the functional unit will report back to the programme controller when the required action has been performed. Signals conveying such information to the programme controller are included in the Data I.

Data J and Data K may comprise class of service signal in respect of a calling service and called service respectively. Whereas the term "Class of service" usually denotes an indication as to which of the facilities provided by a telephone exchange are available to a subscriber, in the present case the term is used with a general interpretation. Thus, every equipment number, whether it relates to a line connected to the exchange or to an item of grouped equipment, has associated with it a class-of-service indication. In the case of an item of grouped auxiliary equipment the class of service indication may indicate for example, that the equipment number relates to "trunk" line terminals LT(T) of the switching network.

Of the internally generated data, Data G constitutes seqencing information generated by the counting circuit CQ associated with the sequence control circuit SC. Data F constitutes programme selecting information, while Data L and Data M may respectively constitute request and instruction informatioon.

The Data H, I, J, and K information on the highways, and also such of the Data M information as may be required is staticised in the staticising store SS and is presented at its output terminals indicated generally at TT. Each translating unit is indicated as having inputs corresponding to all these data items, as well as other internally generated data, but it is contemplated that in practice each unit would be connected only to such of the data sources as are necessary having regard to the particular programmes or sub-programmes being provided in any particular application. It will be appreciated that requirements of different telephone administrations throughout the world vary considerably so that it is desirable to have programme control arrangements of maximum flexibility. For example, although Data H is indicated as an input to all the translating units it may occur that in fact some do not require Data H and in some such case none of the input connections in these units would be connected to the Data H terminals TT. On the other hand it is contemplated that each translating unit may be provided with spare input connections to allow for the addition of new or extended programmes requiring additional input data.

Turning now to a more detailed consideration of functions of the various translating units, the function of the programme sequence circuit PFS/SEI is to determine only the sequence of events to be carried out for any particular connection programme being carried out. The programme instruction store PIS, on the other hand, provides information and instructions both to associated functional units and also (data M) to the programme sequence circuit doing so, however, only on instructions from the programme sequence circuit (data L). For example, if at a point in a programme sequence the group identity of say the register group is required to be provided by the main translator TS so that a free register can be selected and identified, then a code point in the appropriate SEI unit will be connected to provide at this time an appropriate Data L input to the PIS unit. In response to this and to the other data with which the PIS unit is supplied, the register group number may then be passed to the main translator for example as a two out of five code marking over an output highway OM included in highway *ltp* of FIG. 1.

On the other hand certain programmes may diverge at a particular point in the programme and thereafter follow any one of a number of different possible courses depending for example on the class of service of the calling and/or called line or equipment. At such point in the programme the SEI unit concerned would pass a Data L signal to the PIS unit asking for instruction and in response to this the PIS would determine the course to be followed from its other input information (including Data J and Data K) and provide a data M instruction signal to the SEI unit causing this course to be followed.

The arrangement of the programme sequence circuit PFS/SEI in two stages provides an additional simplification. In the programming of a telephone exchange switching system it occurs that programmes can be regarded as forming related programme groups or "families" in which the input information required to define a programme is similar for each programme in the family, and in some cases some of the input data may be common to several programmes. Thus in the arrangement shown in FIG. 3 the sequence event identity stage SEI of the programme sequence circuit is divided into three "family" groups SEIA, SEIB, SEIC, and each of these is supplied with Data F information provided from the output of the programme family selector stages PFS. As an example of a typical programme family, after the calling line has been connected to a register during the setting up of a local call, the register first applies to the common control following receipt of the first dialled digit and receives from the PIS unit a signal indicating that it is serving a local call and should therefore re-apply after receipt of all dialled digits. The register re-applies with the following Data H information, namely the register group identity, a local call staging signal, and a signal indicating that it is a re-application after obeying previous instructions. The result of this is to initiate a programme which will bring about as previously described, the establishment of a communication path between the B side of the register and the A side of a ringing control circuit. The last step in this programme would be the transmission to the register of a staging signal which conditions it to expect connection of a ringing control circuit. However, it may occur that by the time the communication path is actually extended to the selected ringing control circuit, this circuit has been taken into use for another call and therefore tests busy. In this event the common control could be arranged to make another attempt and for this purpose the register would re-apply to the common control, this time inter alia, the following items of Data H information namely register group identity, the "expect a ringing control circuit" staging signal which the register had previously received and stored, and a signal indicating "called circuit busy once." As far as the programme controller is concerned the receipt of this information requires the initiation of a programme which is very nearly identical to that which resulted from the previous application by the register, the only difference being that the programme controller may also instruct the main translator to accept the identity of the previously selected ringer control circuit to enable the group search to continue from there. In another case it may occur that after the register has received the "expect a ringing control circuit" staging signal no connection to such circuit materialises within a predetermined time period. In such a case the register could re-apply to the common control but in this case the Data H information would include a signal to indicate "Path fail once." In this case a teleprinter and fault record equipment which may be provided for observation on the highways from the register and line scanner may respond to this signal by printing out the information present on the highways concerning the path that has failed. The programme controller then proceeds with the programme for establishment of a connection between the register and a different ringing control circuit as previously indicated.

With regard to the sequence control circuit, this includes means for controlling the stepping of the counting circuit SQ in response to Data L information fed to it from the sequence event identifier. Each event signal that is applied to an output highway such as OL, is also applied as a Data L signal to the sequence control circuit to step the counter either to the next position or to some other position determined by this Data L signal. This arrangement can ensure that if a subsequent event identity is dependent upon receipt of an item of Data I information, the counter cannot step until this item of information has been received, and that the programme controller circuit must therefore await the arrival of this Data I information before it proceeds with the programme.

Figure 4:
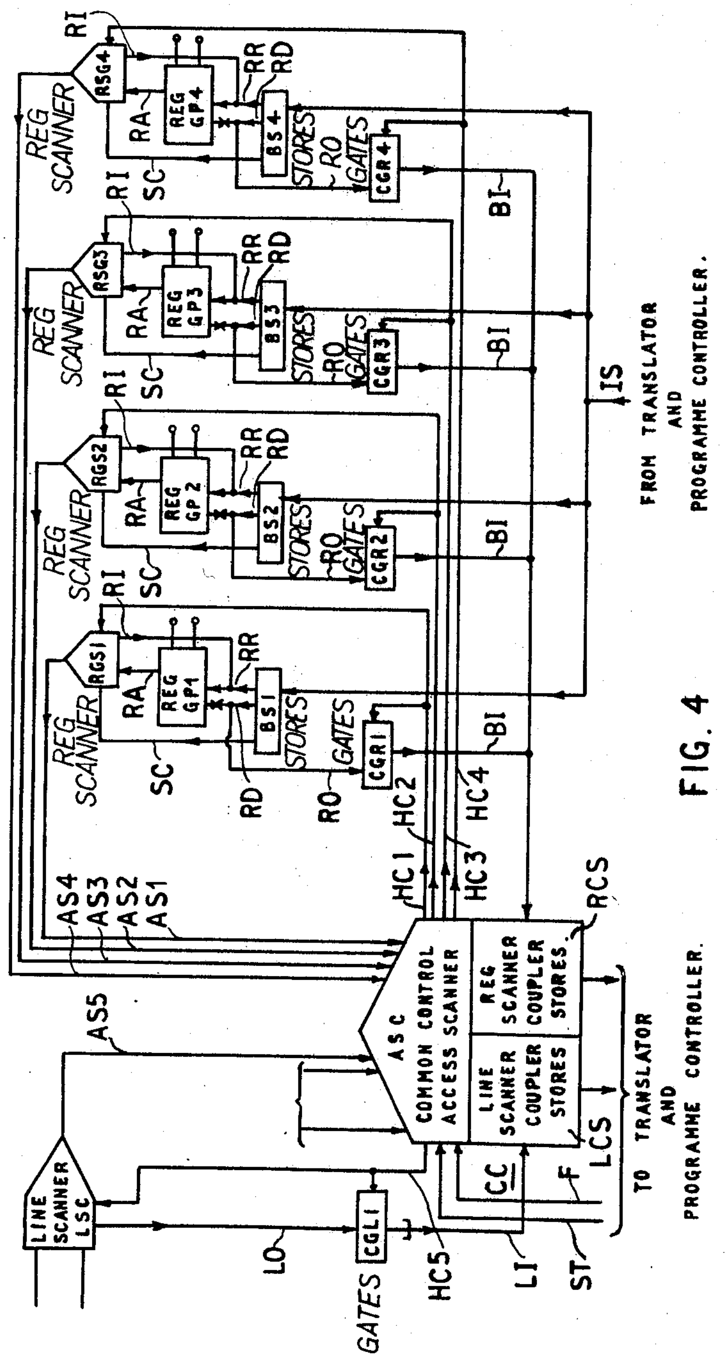
FIG. 4 is a schematic illustration of a common control coupler and its association with the line scanner, registers, and register scanners.

In the present embodiment, only the line scanning and register equipments have access to the common control equipment. The common control coupler CC includes an access scanner arranged to scan the line and register scanners in turn until it encounters one on which a calling or asking condition exists whereupon the scanning action is arrested and storage elements within the coupler are made ready to receive from the line or register scanner as the case may be, the digital information which is required to be processed in the common control equipment; as previously mentioned, this information is passed to the common control coupler together with a staging signal indicative of the particular stage which has been reached in the establishment of the particular call which the calling equipment is serving. The arrangement of the common control coupler CC in relation to the line scanning the register equipment is shown in somewhat more detail in the block schematic diagram of FIG. 4. In this diagram, it has been assumed that, although the registers are all available to the switching network as a single group, they are arranged as regards access to the common control equipment, as a number of separate sub-groups, typically four. This is indicated in FIG. 4 by the four boxes designated respectively, REG.Gp.1 to REG.Gp.4. This grouping is necessary to enable the high speed common control equipment to be taken into use by another register while a previously serviced register is still acting in response to the information signals which the common control had passed to it, the register storage comprising relatively slow relay elements, for economy. This division is also desirable on grounds of security to provide a number of independent functional entities with separate highways, not related in case of failure. It is further contemplated that these separate register groups may be modified for serial processing. To these ends the registers are connected to information highways (IS) from the common control equipment over buffer stores BSI–BS4 of which there is one buffer store (capable of storing all the input information to the registers) for each group of the registers. To enable a calling register in a group of registers to be detected and coupled to the common control, each sub-group of registers is continuously scanned by a register scanner, of which there is one for each register sub-group. In FIG. 4 these scanners are designated RGS1–RGS4 respectively.

Calling highways AS1-AS4 from the several register scanners, together with calling highways such as AS5 from the line scanners LSC (it being assumed that there are a plurality of line scanners each serving a line group of, say, 1000 lines) are scanned for the presence of a calling or "Ask" signal on one of them by the common control access scanner ASC much in the same way as the line and register scanners operate. Digital information is passed from the line scanners and the register groups to line scanner coupler stores LCS and registe coupler stores RCS in the common control coupler CC via common control coupler gates of which one set such as CGL1 is provided for each line scanner and one set such as CGR1–CGR4 is provided for each register group. These coupler gates can be simple pulse plus bias gates to which an actuating pulse is applied from the common control access scanner at an appropriate time as described below.

In describing the sequence of operations of the coupling equipment in FIG. 4, reference will be made to the register coupling actions. Coupling of a line scanner follows a generally similar sequence and therefore need not be described in detail.

When a register in use on a call wishes to gain access to the common control, it applies an "Ask" signal to its associated register scanner RGS over an "Ask" lead such as RA, of which there is one per register in each register group: at the same time the associated buffer store BS is marked busy to the common control equipment. When the register scanner detects this signal, it stops on the calling register and applies over the highway RI digital code signals indicative of the identity of the register on which it has stopped. This identity is recognized by the calling register, or one of them if more than one register in the group is calling at the same time, and acceptance of its own identity causes this register to signal out over the highway RO, to the appropriate set of common control coupler gates CGR1–CGR4, the information which the register in question has available for processing. The register scanner also applies an "Ask" signal over its calling highway AS to the common control access scanner ASC. Upon detecting an "Ask" on one of the calling highways AS1–AS4 (or on the calling highway such as AS5 for a line scanner if a line scanner is calling), the common control access scanner ASC stops its scanning action and applies a "have coupled" signal to the relevant one of the leads HC1–HC4 (or a corresponding lead such as HC5 in the case of a line scanner). The "have coupled" signal pulses the appropriate set of common control coupler gates CGR1 . . . (or CGL1 . . .) to cause these to pass the information on the highway RO (or LO) to the register coupler stores (or line scanner coupler stores) over the appropriate highway BI (or LI). After a suitable delay for the storage and possibly verification of the information in the register coupler stores (or the line scanner coupler stores if a line scanner is involved), the common control access scanner ASC passes a "start" signal over lead ST to a programme controller to indicate that a coupling to the common control has been effected and that information is available for processing. Later when the programme controller has finished the processing function required by the register or line scanner a "finish" signal is applied over lead F to cause the common control access scanner ASC to resume its scanning action. It may here be mentioned that to avoid the possibility of a register sending a mutilated digit to the common control the registers can be arranged so that after dialling has commenced into a register, coupling to the common control can occur only during the period of the inter-train pause between the dialled digits. To this end, each register scanner can be arranged to monitor the continued existence of the "ask" signal on lead RA from the register until the "have coupled" signal from the access scanner is received on the HC lead. Should the register detect the commencement of a further digit after it has applied its "ask" signal but before receipt of the "have coupled" signal, then the register would remove its "ask" signal. This removal would be detected by the register scanner, which in turn would remove its ask condition on its AS lead to the access scanner. Both these scanners would be thereby released from the register to continue their scanning action, leaving the register to reapply its "ask" signal after the next digit has been completely received and registered.

When information is to be passed into a register over highway IS, the information is accompanied by a digital information signal identifying the register group to which the register concerned belongs. This signal is applied in common to all the buffer stores BS1–BS4, only one of which however, having an appropriate coded connection of pulse plus bias coupling gates, will accept the identity. Receipt of the identity of its register group by a buffer store prepares this buffer store to accept the other information on highway IS through other coupling gates in the store. This information will include a digital signal identifying the selected register as well as other information which will be accumulated within the buffer store as the common control executes its programmed control sequence for the particular processing stage concerned. At the end of the control sequence a "finish" signal indicating this is passed over highway IS to the buffer store, which responds by closing its coupling gates and commencing to pass its stored information to the selected register over highway RD. This signal is also applied over the lead F to the common control access scanner ASc causing it to resume its scanning action: the common control equipment is returned to normal to await the next coupling action. Similarly, when all information has been passed from the buffer store to the register, the buffer store is restored to normal and the register scanner resumes its scanning action.

In the case of an initial seizure of a register selected for use on a call, the relevant register buffer store responds as before to digital signals passed to it over highway IS to identify the register and its group (being signals obtained from those provided on highway *ltr* by the group search equipment GS of FIG. 1. In this case the buffer store also applies a digital signal identifying the selected register over highway SC to the relevant register scanner RGS which is thereby caused to immediately set to and remain at the position in its scan corresponding to this register identity. The register identity is then passed over the highway RI into the corresponding register, preparing it to accept information signals direct from the buffer store over highway RD. Over the highway RR, the buffer store applies signals to seize and busy the identified register and to prepare storage elements within the register (e.g. relays) to receive the information which is passed to it. The register identity which the buffer store applies over the highway SC is preferably arranged to have priority over another "asking" register which may have stopped the register scanner. In this case the register scanner would immediately be set to a position corresponding to the register identity on highway SC.

Turning now to a more detailed consideration of the translator and group search equipments TS/GS of FIG. 1, a feature of the present embodiment is that instead of providing a single large and complex translating equipment a number of relatively small translating units are provided. Specifically each translating unit has capacity to provide for the recognition and translation of, say, only 1000 separate digital identities. These translating units can be provided as required in an initial exchange installation and further translating units can be provided at any time thereafter as the installation grows. Another advantage of the use of small translating units is that the units can be grouped according to particular functions. Thus the translating units may be divided into two groups of which one, termed the local translator (FIG. 5) serves basically to translate line directory numbers to corresponding equipment numbers, whereas the other, termed the group translator (FIG. 6) serves in conjunction with the group search equipment GS to provide equipment number translations in respect of the grouped items connected to the line terminals of the switching network, such items including not only the grouped auxiliary equipments such as the registers and ringing control but also PBX line groups and outgoing junction groups. A third translator group could be provided to deal with special translations such as $x—y$ party line translations for shared service working, directory number to directory number translations, and so on. However in the present embodiment it will be assumed that any special translation required will be provided by the group translator. It will be appreciated that the type and complexity of the translating equipment provided will depend on the size and facilities required in any particular exchange installation. The arrangement described herein is typical for exchanges of medium to large size, say 1000 to 10,000 lines or greater. For smaller installations of less than 1000 lines, translation arrangements such as described in bibliographical reference (*m*) could well be employed initially.

Figure 5:
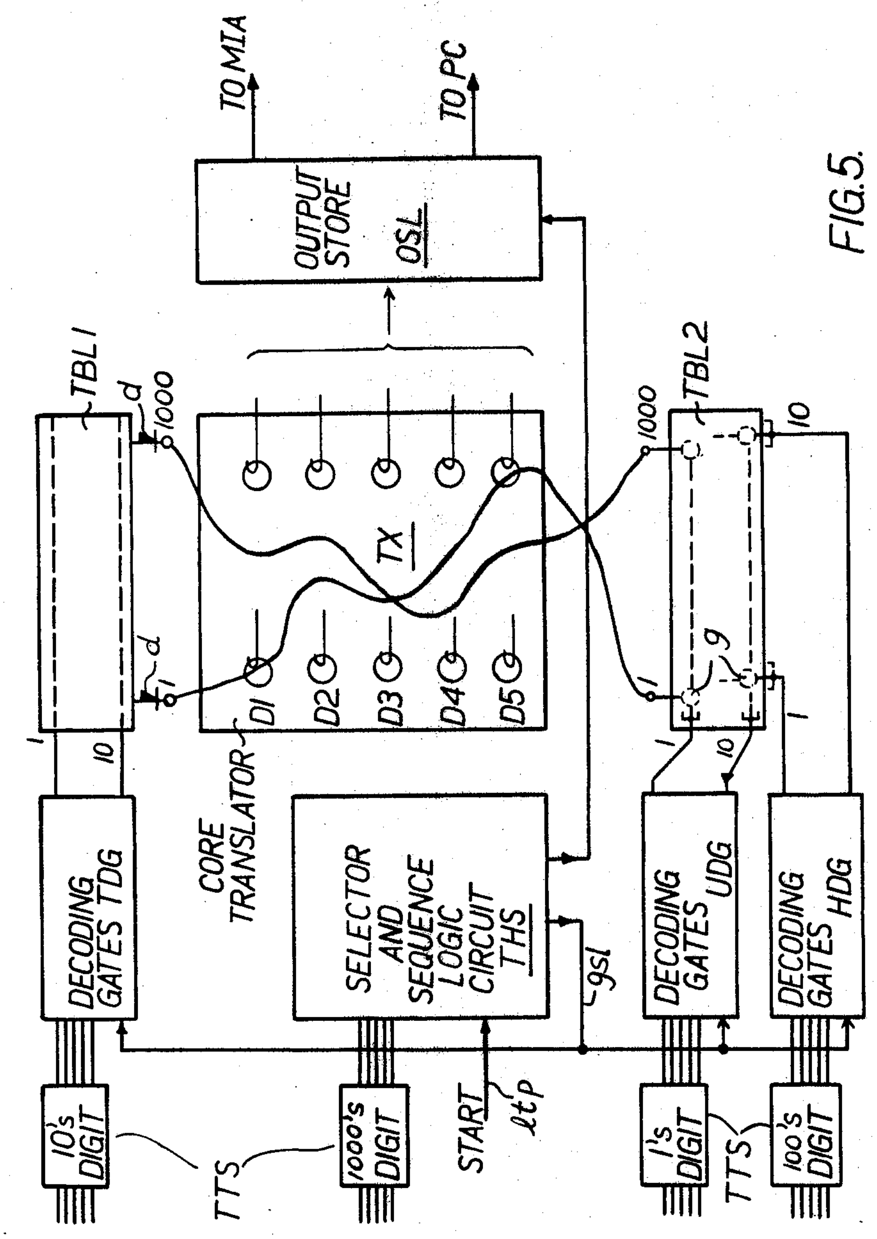
FIGS. 5 and 6 schematically illustrate translation equipment for "local" and "trunk" functions respectively.
Figure 6:
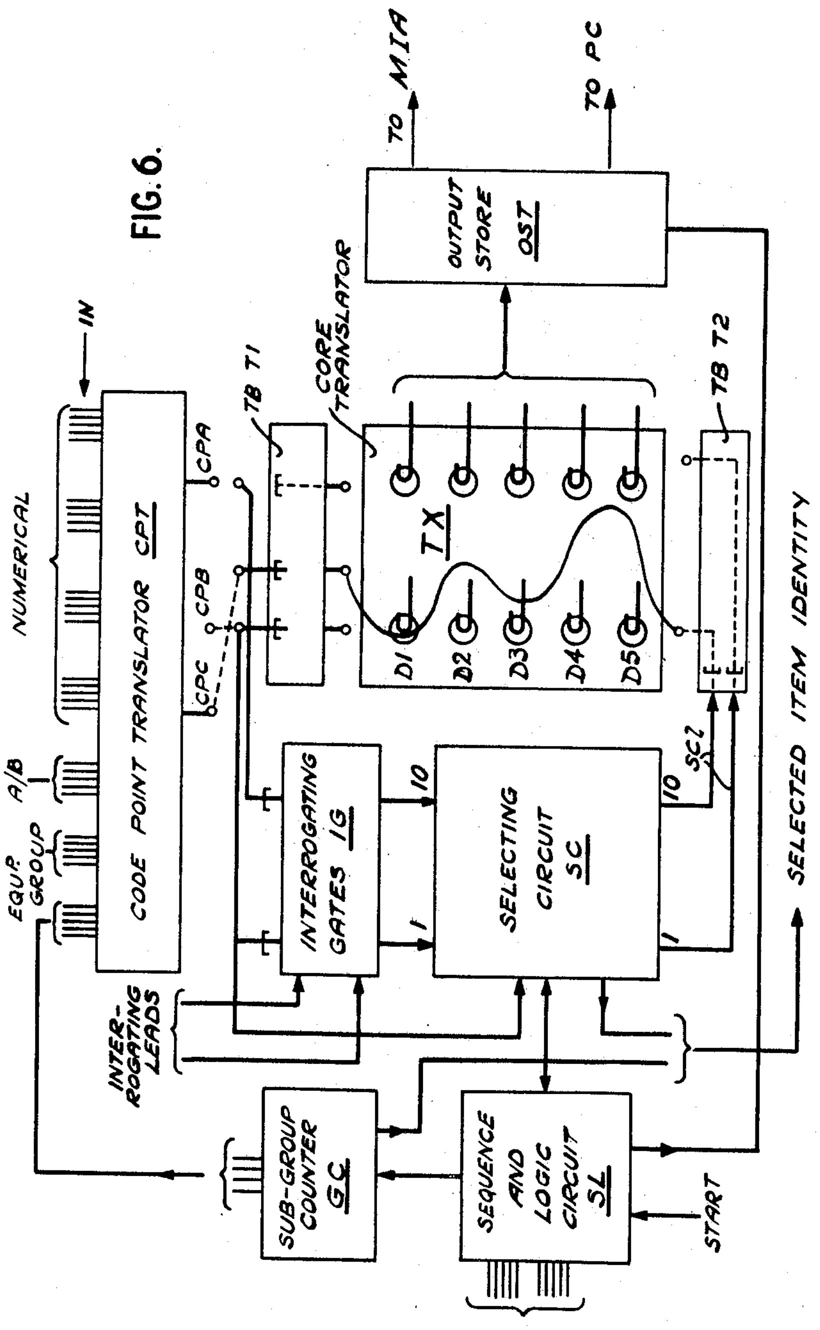

In FIGS. 5 and 6 in each of which only a single, typical, translating unit is shown, the actual translator of such unit, that is, the apparatus which actually gives the equipment numbers and class of service signals, is represented at TX and takes the form of a so-called "Dimond" ring translator. This comprises a magnetic core matrix having one column of cores for each translation digit value and a row of cores for each digit order in the translation. In the figures, for simplicity, only the first and last columns corresponding to the digit values 1 and 0 and only five rows corresponding to translation digit orders D1–D5, are shown. In practice there could typically be seven or eight rows of cores corresponding to seven or eight translation digits of which four provide equipment numbers and two or three provide class of service numbers. If a translation consisting of a greater number of digits were required this could be provided from two translating units operated from the same input. The principle of operation is that each core is provided with an individual output (secondary) winding, while the inputs to the cores are provided by translation wires TW, of which there is one for each identity to be translated, threaded through an appropriate core in each row. Consequently, when a pulse of current is passed through one of the translation wires, an induced current is caused to flow in the output windings of each of the cores through which that wire is threaded. These outputs, after amplification if necessary, are staticised by means of bistable storage elements in an output storage unit OSL or OST which is re-set after the translation has been accepted by the equipment to which it is subsequently transferred. Both translators employ a method of "double ended access" to select the required translation wire of the translator, for which purpose the translating wires extend through the translator cores between two accessing terminal blocks TBL1 or TBT1 and TBL2 or TBT2. Selection is effected by selection of a group of terminals in one terminal block and a co-ordinate selected group in the other such that one and only one translation wire appears in both groups and only this wire is energised by the energising pulse. (*n*)

As shown in FIG. 5 the local translator comprises, in addition to the translators such as TX, an output storage circuit OSL, three sets UDG, TDG and HDG of input digit decoding gates for the units, tens and hundreds digits respectively, and a thousands digit selector and sequence logic circuit THS. Under control of the programme controller input information in the form of the units, tens, hundreds and thousands digits of a line's identity in, say, 2 out of 5 code is received simultaneously from a transfer store TTS which itself received this information from the common control coupler CC. The thousands selector and sequence logic circuit is strapped to respond only to the combination of code markings corresponding to a particular thousands digit. These code markings when received are gated with a start signal from the programme controller on highway *ltp* so that the start signal is effective only in the translating unit to which the received thousands digit corresponds. The units, tens and hundreds decoding gates UDG, TDG, MDG are each provided with an input gating signal from the thousands selector on lead *gsl* so that these gates perform their decoding function only if the appropriate thousands digit has been accepted. The decoding gates decode the 2-out-of-5 input markings to a 1-out-of-10 output marking. The terminal blocks TBL1 and TBL2 each provide 1000 terminals and these provide for the termination of 1000 primary translation wires which thread the cores of translator TX to form a translation field. In the block TBL1 the terminals are commoned in groups of 100 terminals each, and each group is connected to a different one of the 10 output marking leads from the tens digit decoding gates TDG. A received tens digit therefore marks the 10 input wires to which the tens digit corresponds in each hundred. In the terminal block TBL2, the terminals are marked coordinately from the output marking leads from the hundreds and units decoding gates HDG and UDG, the markings on these leads being gated together through pulse plus bias gates indicated at *g*: to this end each hundreds marking lead is connected to the bias inputs of a group of 100 gates, there being one such group for each of the 10 such leads, and the pulse inputs of corresponding gates from the several groups are commoned to a particular one of the units marking leads. The point of conjunction of the two inputs of each gate is connected, according to the particular hundreds and units marking leads with which the gate is associated, to the 10 terminals having the same units place in the several groups of 10 in the particular group of 100. Diodes *d* are connected individually in series with all the translation wires threading the cores and constitute output diodes for the gates, each gate having 10 such output diodes because of the common connection of it's input conjunction point to 10 terminals of block TBL2. With the bias input resistors and pulse input capacitors of the gates physically associated with terminal block TBL2, it is convenient for the output diodes to be physically associated with terminal block TBL1 as indicated on the drawing. Receipt of particular combination of thousands, hundreds, tens and units digits results in the marking of a particular translation wire in the particular translation unit which serves the thousands digit. The thousands selector and sequence logic circuit, in addition to effecting the thousands digit selection, also performs a sequence of operations leading to a pulse of current being driven through the selected translation wire of the translator, thereby activating the cores through which this wire is threaded and causing the translation to become staticised in the ouput storage equipment OSL. At the same time the output from the core in the first row of cores (it being arranged that each input wire threads a core in this row) is gated out to provide a "translation available" signal to the programme controller. After the translation has subsequently been abstracted the programme controller applies a release signal to the translator and this re-sets the sequence control circuit and output store, thus restoring the translator to normal.

Turning now to the group translator unit and group search equipment shown in FIG. 6, this comprises in addition to the translators TX a separate code point translator CPT, a group of interrogating pulse-plus-bias gates IG divided into sub-groups, a selecting circuit SC, a sequence and logic circuit SL, a group counter GC and a staticising output store OST similar to that described above for the local translator. The translator TX operates to produce a translation in a generally similar manner to that described for the local translator. The code point translator CPT may comprise a modular translating arrangement as described in bibliographical reference (*k*) and is supplied with its input information, again from transfer stores, on groups of leads IN. The numerical part of the input information comprises, in the case of PBX groups and outgoing junction line groups, the four digits constituting the directory number of the group. In the case of grouped auxiliary equipments the numerical input consists of a separate digit (or digits) identifying the group required (i.e. whether a register group, ringing control circuit group or whatever), and this is accompanied by further input markings which identify which side of the grouped equipment (i.e. A side or B side) is required. In addition a further digital input is provided by the translator equipment itself for use in the group selecting function of the translator, as described below.

A group (whether of lines such as PBX and outgoing junction lines or of auxiliary equipment) may contain up to 100 items and these are arranged in sub-groups of 10, with a partial sub-group provided if required, i.e. if the total number of items in the group is not an integral multiple of ten. Each code point such as CPA, CPB, CPC of the code point translator CPT relates to a particular sub-group, and for each sub-group of double ended items there are two code points relating respectively to the A and B sides of the items in the sub-group. Each code point is connected in common at the terminal block TBT1 to a set of 10 input wires of the translator TX, and each A side code point such as CPA, CPB is connected to the pulse input leads of a corresponding subgroup of the interrogating gates IG. The bias leads of these interrogating gates are connected in a certain order to busy/free test connections extended via the distribution frame DF from the corresponding sub-group of peripheral exchange terminals serving the sub-group of items. When a code-point is marked this causes the corresponding sub-group of interrogating gates to be pulsed and those associated with free items of equipment, being correspondingly biased, open to pass marking on a set of 10 marking wires to a selecting circuit SC. This operates to select the free item nearest one end in the order in which the items are connected to the interrogating gates. To explain the operation, let it be assumed that the programme controller has determined that connection is required to the A side of a free register which has to be selected from a group containing between 10 and 100 registers. In this case the programme controller supplies a digit identification of the register group and an A side code marking to the translator transfer store and provides signals to effect the application of the digital code signals to the code point translator and to start the translating sequence under control of the sequence and logic circuit SL. This results in the setting of the sub-group counter GC to a first condition and a digital marking corresponding to this condition is applied as an input to the code point translator. As a result a code point such as code point CPA, corresponding to a first sub-group of registers, is marked. This marks a first register set of translation wires in common at the terminal block TBT1 and also marks the corresponding sub-group of register interrogating gates. If no register in this sub-group of registers is free, a "no free register" signal is passed to the sequence and logic element SL which causes the sub-group counter GC to advance to a second condition. As a result the marking of the code point CPA is removed, another code point output such as CPB is marked, and the next sub-group of register interrogating gates are pulsed to pass markings indicating the free registers, if any, in this sub-group. If still no free register is found the above procedure is repeated until the last sub-group of the register group is reached, and if no free register is found in this last sub-group, the "no free register" signal passed from the selecting circuit causes the sequence and logic circuit SL to terminate the action, and a signal is passed to the programme controller to indicate "no registers available."

If, however, a free register is found during the course of the action just described then the selecting circuit SC marks one of ten output leads *scl* to identify the position of that register in its sub-group. In terminal block TBT2 this marks the translation wires which have a corresponding position in the sets of these wires commoned to the code point outputs at terminal block TBT1. We now have the particular set of translation wires marked in terminal block TBT1 and the particular one which has been selected marked in terminal block TBT2. A current pulse is driven through the translation wire thus defined, and the translation outputs from the cores threaded by this wire are staticised in the output store OST to represent the equipment number of the A side of this register. At the same time as this translated equipment number information is passed to the output store, the settings of the sub-group counter GC and the selecting circuit SC are fed out to the register buffer stores (BS, FIG. 4) in the form of markings defining the number of the selected register in the register group. It will be appreciated that the interrogating, selecting and translating functions described apply equally to all grouped items including PBX lines and outgoing junction lines. In each case the translator, as well as providing a routing number, may also provide a class of service code applicable to the PBX line, outgoing junction or equipment concerned.

In addition to the selection and translation function described above it is also necessary to be able to force the choice of a particular translation wire when it is required to establish a further connection to the B side of a previously selected item of grouped equipment. In this case when the register applies to the common control for this further connection to be set up, it will pass to the common control coupler stores, among other information, the digital group identity of the group concerned, the number of the item within the group, and an instruction code requesting the equipment number of the B side of the item. Under instruction from the programme controller this information is presented via the translator transfer stores to the code point translator CPT, and the item identifying signals are fed to the sequence and logic element SL. The start signal from the programme controller is accompanied by a further signal instructing a "forced choice" to be made, and upon receipt of these signals the sequence and logic element SL causes the sub-group counter GC to be set according to the sub-group of the item, and the selecting circuit SC to be set according to the number-in-the-sub-group of the item. The application of the sub-group identity of the item to the code point translator input completes the marking of a specific B side code point such as CPC (note that this is not connected to the interrogating gates) while the setting of the selecting circuit defines the particular translation wire in the set connected to the specific code point. A further facility which may be provided is that of "research". After a free item has been found and the translator has provided the corresponding equipment number, the item is not busied until the connecting path is set. It may therefore happen that during the time required to establish the communication path to the item concerned, the item has been seized for another call as a result of previous data processing and is therefore found to be busy when tested by the marker after the communication path is established but before it is finally switched through to it. In such a case it may be arranged that a sequence of operations similar to that described above for "forced choice" is caused to occur, but in this case the instruction signal from the programme controller is a "research" signal which causes the group search equipment to be set according to the identity of the item thus found to be busy and a search for another, free, item of the group to be continued from that point.

With regard to the interrogator and marker equipments I and M indicated in FIG. 1, these perform the route interrogating and cross-point control functions for the switching network in a manner generally similar to that described in bibliographical reference (*b*). However certain modification is required in the present embodiment because of the provision of separate local and trunk switching trains in each switching sub-unit and of the compound link circuits (LC) between adjacent switching sections as previously described. Further, if the provision of link circuits between switching sub-units in adjacent switching sections is increased by providing the "C" stage switches with sufficient inlets to enable duplication of the compound links and indicated by $LC^A$ in FIG. 1, the modification has to allow for this also. Alternative routes respectively involving two duplicate links such as LC, $LC^A$ are referred to as the "path 1" and "path 2" routes.

Considering the interrogator equipments I (FIG. 1) these are provided at the rate of one per switching sub-unit of the exchange. It is recalled that the switching network N of the present embodiment comprises separate trunk and local switching trains each of which has three switching ranks or stages A, B and C and that as described in bibliographical reference (*b*), a line terminal LT of the switching network has access to the B stage of a switching sub-unit such as SU1/W over only one of the connections extending between the A stage switch to which the line terminal is connected and the B stage. Also corresponding outlets in each of the C stage switches in the local or trunk switching train of a sub-unit are connected to the inlets of a corresponding one of the B stage switches (so that the digit identifying a group of correspondingly numbered C outlets will also define the inlets of a particular B stage switch), and correspondingly numbered inlets of these C stage switches are connected through the link circuits to a particular sub-unit in an adjacent switching section, so that the C stage inlets having access to that sub-unit can be defined by specifying this particular sub-unit in terms of a switching unit considered as constituted by all sub-units such as SU1/W, SU1/X, SU1/Y having one and the same ordinal position in their respective sections.

The function of each interrogator I is to examine all relevant routes within a sub-unit for a particular through connection and to signal the free routes to the associated route choice equipment IRC. As described above a communication path through the switching network involves two sections of the network and a link: an incoming portion of the path is completed over a switching sub-unit in one section and an outgoing portion of the path is completed over a switching sub-unit in another section. Thus, for a particular (incoming or outgoing) path portion between the line terminals LT and links such as LC, the interrogation of a sub-unit train of switches involves interrogation of the particular B stage outlet to which the required A stage outlet has access through the relevant A switch, interrogation of the C stage outlets, these being co-terminous with the inlets of the particular B stage switch, and interrogation of the C stage inlets to which are connected links which couple the sub-unit in question to those sub-units in the adjacent sections through which the line terminals of the other path portion of the required connection have access to the links.

It is remarked here that each sub-unit in each section is connected through links not only to the sub-units of the next section but also to those of the preceding section. A link connection to the next section will be termed a "down" connection (D), while a link connection to the preceding section will be termed an "up" connection (U). Thus in FIG. 1 a connection through link LC3 is a "down" connection in respect of sub-unit SU1/X but an "up" connection in respect of sub-unit SU1/Y: the appended references D(1), U(1) indicate that these are "path 1" connections.

For a particular path portion of a connection the interrogator concerned is supplied from the marker interrogator accumulator MIA with the following information signals:

(1) Signals defining the B outlet and C outlets of the switching train which have access to the required line terminal.

(2) A signal defining the C stage inlets in terms of the sub-unit to which the other ends of the links associated with these inlets are connected.

(3) A signal indicating whether the trunk or local switching trains are involved in the connection.

(4) A signal indicating whether a through-link or bridge-link is required.

The interrogators preferably perform their interrogating function in a parallel mode rather than a serial, rank by rank, mode. To this end the interrogator may comprise a number of panels each containing a matrix of pulse-plus-bias interrogating gates. A first matrix serves to enable the busy/free condition of the required B stage outlet to be interrogated. This matrix comprises a column of interrogate gates for each B switch in the switching sub-unit, the bias inputs to these gates being constituted by connections which are respectively associated with the B stage outlets and have one or other of two potentials (one of which constitutes a "bias" for the gates) according as the associated outlet is busy or free. The columns may be considered as being in pairs one column of a pair corresponding to a B switch in the local switching train while the other corresponds to a corresponding B switch in the trunk switching train. The pulse inputs to the gates in each pair of columns are derived from the C outlet signal (recalling that this also defines a particular one of the B stage switching matrices) and a "local" or "trunk" signal. These signals are gated together within the interrogator to provide a driving (pulse) signal common to all the interrogating gates in the particular local or trunk column of the pair of columns to which the C outlet signal corresponds. The outputs from the interrogate gates in each row in the matrix are commoned onto an individual output lead for the row, so that as a result of driving a particular column of gates, corresponding to a particular B switch, the output leads from the rows of gates will carry a pattern of busy/free markings which will correspond to the busy/free conditions of all the outlets from the B switch in question. The markings on these leads are now gated individually with corresponding B outlet marking leads the relevant one of which carries the B outlet signal. If the required B outlet is free, the corresponding gate provides an output signal, indicative of the fact, which is staticised by means of a bi-stable circuit element. A second matrix of interrogating pulse-plu-bias gates serves to interrogate the C stage switches having free outlets to the B stage switch concerned. In this case the rows of gates correspond to the different C stage switches, while the columns respectively correspond to the several outlets from each of these switches. The gates of each column have their bias input leads constituted respectively by connections which carry distinctive busy/free potentials according to the busy or free conditions of the corresponding outlets from the several C switches, namely the first outlets for the first column of gates, the second outlets for the second column, and so on. As in the first matrix the columns are arranged in pairs, one for local and the other for trunk and the gates of each column are driven by a pulse signal derived from the relevant C outlet signal in conjunction with a "trunk" or "local" signal. Thus, the result of driving a particular column of gates is to provide a pattern of busy/free output markings from the gates corresponding to the busy/free conditions of the particular C outlet in the several C switches. By causing the free output markings from the various rows of gates to operate bi-stable elements, staticised markings are obtained indicative of those C switches which have free outlets to the required B switch.

The C inlet interrogation is divided into two parts, one involving the "up" connections through the links and one the "down" connections. Two separate matrices are provided for this function. These are substantially identical and only one, the "up" matrix will here be described. In this matrix the interrogating pulse-plus-bias gates are in columns corresponding to the "up" link connections from the sub-unit, each such connection for example U(1) from SU1/Y having four columns of gates. Of these one pair of columns refers to the local access point (LB) in the relevant compound link (LC) while the other refers to the trunk access point (TB). In each pair, one column relates to the bridge link path (BL) while the other relates to the through link path (TL). The received C inlet signal in terms of the unit containing the other portion (calling or called) of the path being established, is gated with the other signals indicating whether the trunk or local switch trains are involved and whether a bridge or through link is required. Receipt of these signals results in the appropriate one of a group of four columns of interrogate gates being driven to produce output signals on output leads which are commoned with corresponding gates in the same matrix rows. There is thus produced a pattern of markings indicative of which of the C switches have a free inlet or inlets connected to an appropriate bridge or through link (as the case may be) in the compound links leading to the sub-unit containing the other portion of the connection being established in the adjacent (preceding) switch section. As in the previously described matrices the free output markings are staticised. Where the switching network provides "path 1" and "path 2" connections the staticised output markings are correspondingly grouped. Now the staticised B outlet marking, the staticised C outlet markings and the staticised C inlet markings are gated together on a C switch basis, i.e. for each C switch, the free C outlet marking, if present, is gated with the free C inlet marking for that switch, if present, and with the individual free B outlet marking. As a result of this gating action a pattern of markings is obtained indicative of the C switches capable of dealing with this portion of the required connection. If path 1 and path 2 links are provided this pattern would be presented to the inter-section route choice equipment IRC in two sub-patterns, one for path 1 routes and the other for the path 2 routes. Similarly for the "down" connections provided by the second of the C inlet interrogating matrices, two further sub-patterns of C switches capable of dealing with the call would be presented to the inter-section route choice equipment. Since only one interrogater equipment is provided per switching sub-unit of the exchange, it may happen that that same interrogator would be required to function in respect of both the incoming portion of one possible communication path for the required connection and the outgoing portion of another such path. To cater for this condition the common control provides for the complete interrogation to be carried out in two phases. For example, in a four section exchange, the sections being referred to as W, X, Y and Z respectively, interrogation may be performed in sections W and Y for the incoming portions and in sections X and Z for the outgoing portion in phase 1, and vice versa in phase 2. In each phase, the common control would address the appropriate interrogating equipment in each exchange section.

The equipment designated "Route Choice" (IRC) will now be considered. In bibliographical reference (*b*) the general principle of inter-section route choice and one method of effecting such choice is fully described. Briefly, however it may be said that the function of the route choice equipment is to determine which link circuits extending between sub-units in adjacent sections of the switching network are capable of completing a connection between interrogated free incoming and outgoing path portions of the switching network.

The inter-section route choice arrangements used are generally similar to those described in bibliographical reference (*b*), but may differ in the following respects.

(1) Only one inter-section route choice equipment is provided between each pair of switching sections except in the case where the switching network is divided into an odd number of switching sections, in which case two (modified) inter-section route choice equipments are provided in respect of the pair comprising the first and last of the sections; thus considering a network having five switching sections designated V, W, X, Y, Z, the two route choice equipments are required between the sections V and Z, while only one inter-section route choice equipment is required between each of the other pairs. This will be explained more fully below.

(2) The inter-section route choice equipment makes no attempt to effect a particular choice of route between the sections which it serves but acts simply to mark out, on individual marking wires, markings indicative of all the link circuits capable of interconnecting interrogated path portions in these sections.

The normal inter-section route choice equipment, as distinct from the modified equipment mentioned above, comprises a set of co-incidence gates of which there is one for each of the outputs ("up" or "down") obtained from the associated interrogator equipments and pertaining to different C switches. Thus, suppose a switching sub-unit contains eight C stage switches, then there will be eight outputs "up" and eight outputs "down" from the interrogator equipments and the intersection route choice equipment will contain eight coincidence gates. Each of these gates will have one input connected in common to the respective "up" or "down" outputs as the case may be from each of the interrogators in the one section, and another input connected in common to the respective "down" or "up" output as the case may be, from each of the interrogators in the other section. Where the switching network provides two link routes between the C switches in different sub-units i.e. the "path 1" and "path 2" routes, then the intersection route choice equipment will include two sets of coincidence gates as described above, one set for "path 1" choices and the other for "path 2" choices. Each coincidence gate has an output lead which is branched to provide two output connections to the common control equipment, one of these branch connections including a bi-stable storage device and the other being a straight through connection. This arrangement of the coincidence gate outputs is required because of the use of the two phases of interrogation as described above. Thus, at the conclusion of the phase 1 interrogation the intersection route choice equipment causes the output marking from its gates to be stored within itself. At the conclusion of the phase 2 interrogation the stored output markings relevant to phase 1 are passed to the common control from the storage devices together with the phase 2 markings which are passed directly over the straight through connections.

The foregoing may be more clearly appreciated by considering the chart below which assumes a "P–Q" multipling in the X, Y and Z sections as described in bibliographical reference (*b*).

| | 1 | 2 | 3 | 4 |
|---|---|---|---|---|
| W | Cg | | Cd | |
| X | | Cg | | Cd |
| Y | Cd | | Cg | |
| Z | | Cd | | Cg |

Assume that the chart represents the switching network of the exchange which is divided into four sections W, X, Y and Z each of which has four switching sub-units 1, 2, 3 and 4 so that the co-ordinate W/1 represents sub-unit 1 in section W, co-ordinate X/2 represents sub-unit 2 in section X and so on. Assume also that for particular calling and called line terminals of the network access to the calling line terminals may be had by the sub-units designated *Cg*, while access to the called line terminals may be had by the sub-units designated *Cd*.

In phase 1, the common control causes calling path portions to be interrogated in sections W and Y, and the called path portions to be interrogated in sections X and Z. It does this by passing the routing information appertaining to the calling path portion to the interrogators serving sub-units W/1 and Y/3 and by passing the routing information appertaining to the called line to sub-units X/4 and Z/2. The intersection route choice equipments are connected between the pairs of sections W–X, X–Y, Z–W and these correlate the interrogated free path portions in the pairs of sub-units W/1–X/4 (down) Y/3–X/4 (up) Y/3–Z/2 (down) and W/1–Z/2 (down) as previously described. In phase 2, the common control reverses the pattern of interrogation by causing the called path portions in sections X and Z, that is, in this phase the routing information relating to the called path portions would be passed to the interrogators for sub-units W/3 and Y/1 and that relating to the calling path portions to the interrogators for sub-units X/2 and Z/4.

In the case where the switching network comprises an odd number of sections, for example the three sections W, X, Y, only, it will be noted that in phase 1, both the sections W and Y are caused to interrogate the calling path portions so that inter-section route choice cannot be carried out between the sections W–Y. Similarly, in phase 2 the called path portions are interrogated in both the W and Y sections. To overcome this difficulty a modified route choice equipment is used comprising two sets of coincidence gates from which the outputs are connected over direct through connections to the common control. However, outputs from the interrogators operated in phase 1, that is the interrogators associated with sub-groups W/1 and Y/3, are stored in bi-stable storage elements associated with the "down" and "up" inputs to the gates in the intersection route choice equipment. In phase 2, the stored information relating to the calling path portions is gated with the called path portions as interrogated in the two sub-units W/3 and Y/1 and presented directly to the other sides of the inter-section route choice equipment.

With regard to the marker circuits these comprise input storage elements which are coupled over signalling highways to the market interrogator accumulator MIA. Logic circuitry in the marker determines the sequence of the various functions which the marker circuit performs, including control of the operation of the cross-point switches included for establishing the selector route, as well as performing busy/free testing and information transfer when required. To enable a marker to perform its various functions, it is provided with the following items of information from the common control:

(1) A signal defining the switching sub-unit over which connection is to be established: since only one marker per sub-unit is provided this also defines the marker involved in setting the connection.

(2) Signals defining the relevant A stage, B stage and C stage outlets in the switching network.

(3) A signal defining the sub-unit in the adjacent section involved in completing the call.

(4) A signal indicating whether a path 1 or a path 2 link is to be used for the call.

(5) A signal indicating whether the connection is to be established over the local or trunk switching trains in the switching sub-unit.

(6) A signal indicating whether a bridge or through link is to be used for the connection.

These signals are gated together as necessary to determine the particular switch inlet and outlets between which the cross points are to be operated in the three switching stages.

In appropriate circumstances the marker also receives:

(7) A signal indicating that a communication path is to include an A stage cross point already in use on a connection through the same switching section and previously established in respect of the same call, this signal being used to establish an "overmark" condition as described in bibliographical reference (*e*).

In addition to these items of routing information the common control may supply to the marker, and the marker utilise appropriately, two further items of information as follows:

(8) To enable the same marker circuits to operate in respect of a number of different types of connection, i.e. to operate on the calling or called sides of a connection for local, incoming or outgoing trunk calls and the like, the marker circuits may be designed to accept one of a number of what may be termed mode signals which are gated within the marker with the outputs of a sequence counter so that the sequence and timing of operations carried out by the marker is dependent upon the mode signals which it receives.

(9) Since only the register and the linescanner equipments have direct access to the common control, the marker circuits, provide a convenient vehicle for conveying information from the common control to other items of control equipment which may be taken into use for a call. The common control may therefore supply the marker with service instructions such as a class of service marking which the marker stores, and at a suitable point in its sequence of operation it transfers this information to a circuit, e.g. a feeding bridge or outgoing junction circuit, to which it has established a required communication path.

(10) To cater for low traffic subscribers or extra large units, it may be convenient to permit more than one A switch to be connected in parallel to the same set of B switch outlets. This would necessitate replication of the A stage marking wires from the marker so as to separately serve these additional A switches and the A stage marking information would in these circumstances comprise the setting information plus a further signal indicating the particular set of A stage switching commons to be marked.

Instead of providing one marker M and interrogator I for each switching sub-unit, two markers and interrogators may be provided to function separately in respect of the local switching train and the trunk switching train. The particular marker and interrogator required to act at any time would be rendered active in response to the signal indicating local or trunk switching train.

FIGS. 7–15 give some examples of other combinations of communication paths that can be established through a switching network and links to meet different requirements. The order in which the various path portions are established is indicated by the numerical part of the cross-point designations: that is the first path portion incorporates the cross-points A1, B1, C1, the second incorporates the cross-points A2, B2, C2, and so on.

Figure 7:
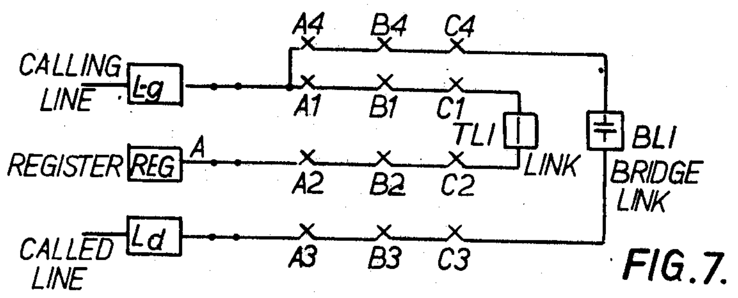

FIG. 7 shows a simple case for the establishment of a local call.

The trunking involves the establishment of a first short term path A1, B1, C1, TL1, C2, B2, A2, between the calling line L*g* and a register REG, TL1 being a through-connecting link, and subsequently, after the register has received the identity of the required called line L*d*, the establishment of a final long term path A4, B4, C4, BL1, C3, B3, A3 between the calling and called lines L*g* and L*d* through a bridge link BL1.

Figure 8:
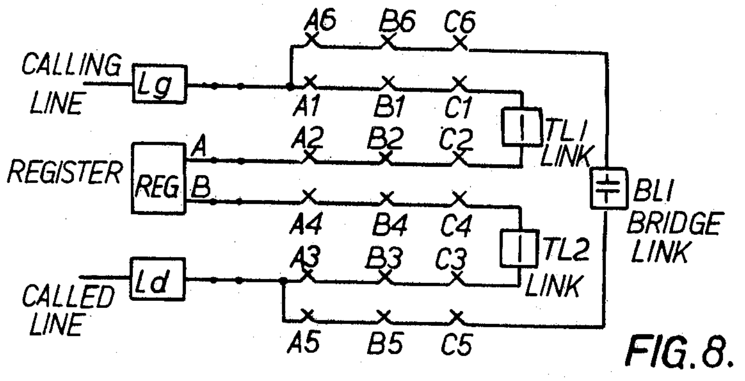

FIG. 8 shows the inclusion of a second short term path between the register REG and the called line L*d* via another through-connecting link TL2. This permits the use of the register path check facility. After the short term paths have been established between the calling line L*g* and the register (path A1, B1, C1, TL1, C2, B2, A2) and between the register and the called line L*d* (path A4, B4, C4, TL2, C3, B3, A3) followed by the establishment of the final long term path A6, B6, C6, BL1, C5, B5, A5 between the two lines, a loop extends from the A side of the register to one side of the bridge link BL1 via the link TL1 and from the B side of the register to the other side of the bridge link BL1 via the link TL2. The existence of this loop enables the continuity of the wires forming the complete path to be checked, using potential conditions established at the feeding bridge BL1 and within the register REG to verify the continuity condition.

Figure 9:
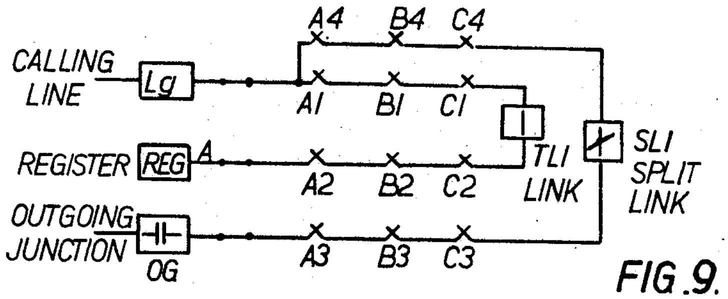
Figure 10:
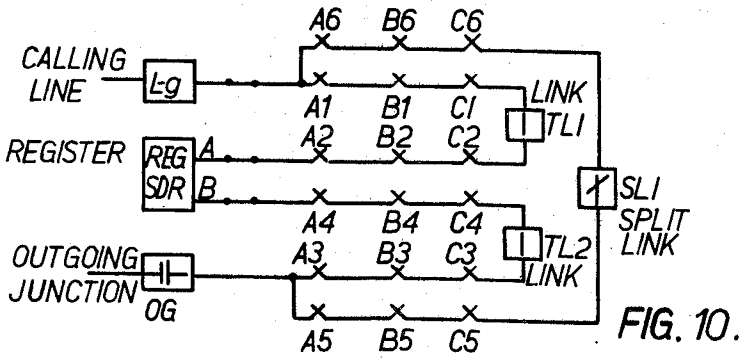

FIGS. 9 and 10 show trunkings corresponding to those shown in FIGS. 7 and 8, but suitable for use on outgoing junction calls. The main difference in these trunkings is that in the outgoing junction case the feeding bridge is provided in accordance with conventional practice in the outgoing junction line circuit of the outgoing junction as indicated by the capacitor symbol in the block OG. Consequently the bridge links BL1 in FIGS. 7 and 8 are replaced in FIGS. 9 and 10 by through links S11. These through links SL1 are in a form which can be "split," for instance as described bibliographical reference (*c*) so as to be able to maintain a temporary disconnection in the long term communication paths through them. Thus in FIG. 9, which relates to a case in which the digit received over the calling line can be passed directly to the outgoing junction, it is preferred not to finally complete the long term path by the last to be operated (A4) of the included cross-points but to maintain a disconnection in the split link SL1 until after all the cross points have been operated. In FIG. 10 which relates to a case in which the register incorporates or cooperates with a sender SDR for sending the digits out over the outgoing junction, the split link SL1 maintains a disconnection in the long term path until all digits have been transmitted over the outgoing junction, such a split condition preventing incoming pulses trains clashing with digits being transmitted over the outgoing junction.

Figure 11:
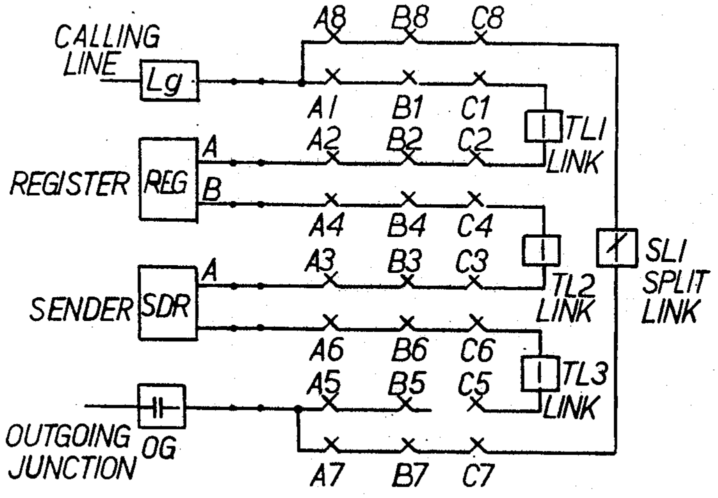

FIG. 11 shows a similar form connection for an outgoing junction call in which the register REG and sending equipment SDR are separate. This connection involves the establishment through the switching network of three short term communication paths and a single long term path, the latter including a split through link SL1.

Figure 12:
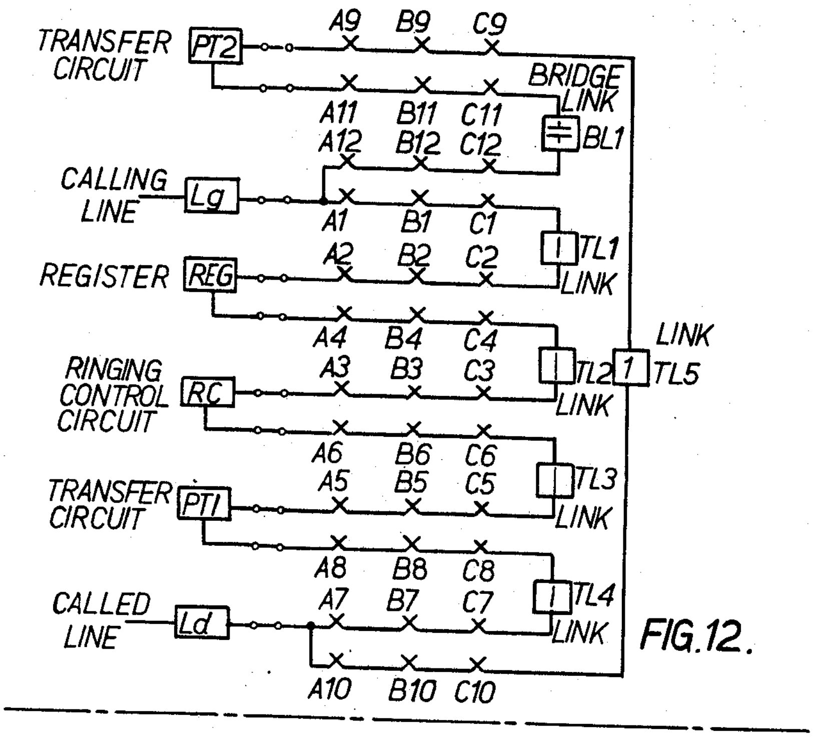

FIG. 12 illustrates the form of connection that may be established through planar transfer circuits if congestion is encountered. Thus by way of example, FIG. 12 illustrates a case in which a planar transfer circuit PT1 has been taken into use to avoid congestion encountered in attempting to establish a direct short term path between the ringing control circuit RC and the called line L*d*, while another planar transfer circuit PT2 has been taken into use to avoid congestion encountered when attempting to establish the long term between the calling and called lines. It will be noted that the bridge links (BL1) is connected in the last path to be established through the switching network, i.e. the path containing the crosspoints A11, B11, C11 and A12, B12 and C12. The reason for this is to enable the register, once connected, to verify the arrival of each subsequent item of equipment by observing the potential condition on the test wire (p-wire) as these items of equipment become connected up.

Figure 13:
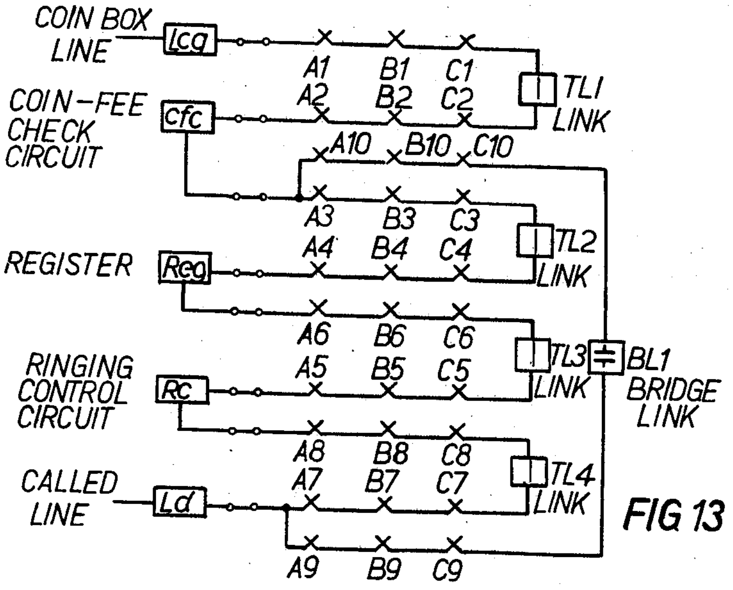

FIG. 13 illustrates the trunking that could normally be established (i.e. without congestion being encountered) on a local call from a local coin-box line to an ordinary local line. In this case a first long term path is established between the coin-box line Leg and a coin-fee-check circuit CFC. This latter circuit is then regarded as the originating circuit for the call and the remainder of the connection is dealt with in exactly the same way as for a call between two ordinary lines.

FIG. 14 illustrates the case of a call over an incoming junction JC to a coin box line L*cd*. Here again a coin-fee check circuit CFC is incorporated in the long term path. Planar transfer circuits PT1 and PT2 are shown utilised between the ringing control circuit R*c* and the called coin-box line L*cd*, and between the coin-fee check circuit CFC and the incoming junction line I*c*. In this case, connection between the incoming junction line IC and the register REG may be effected initially over a T.D.M. dial path DP as described in bibliographical reference (*h*) and (*j*), followed by the establishment of the first short term communication path A1, B1, C1, TL1, A2, B2, C2: the connection would then proceed as for a normal call.

FIG. 15 illustrates a possible variation for which provision could be made when a certain amount of incoming multi-voice-frequency (MF) signalling has to be catered for, but not sufficient to justify the inclusion of M.F. receiving equipment in all registers. In this case the registers can be provided with a three-sided connection to the switching network, the A and B sides being used as previously described while the C side is used to provide a branch short term path through the switching network to enable an M.F. receiver to be taken into use when required.

In the trunking plot shown in FIG. 2, and in certain of the other exemplary trunking plots shown in FIGS. 7 to 15, double-ended registers and ringing control circuits are employed, that is, they have an A side and a B side. A circuit of a double-ended ringing control circuit is shown in FIG. 16. This circuit has negative, positive, private (or test) and holding wires —A,+A, PA and HA at its A side, and negative, positive, private (or test) and holding wires —B,+B, PB and HB at its B side. As mentioned previously with reference to FIG. 1, these A side and B side wires are strapped via the distribution frame DF to line terminals LT of the switching network N. The circuit also has a busy/free wire B/F by which the condition (busy or free) of the circuit is signalled to the group search unit GS in common with the busy/free conditions of the other ringing control circuits of the group of such circuits provided for the system. When the circuit is busy, one or more of the contacts KA4, F6 and KB2 is closed to apply earth potential to the wire B/F, in which case the circuit is precluded from selection for a call. When the circuit is free a negative battery potential connected via resistance R1 is present on wire B/F to indicate that the circuit is free and is thus available for selection.

When the ringing control circuit is free, a negative battery potential is present on both its private wire PA/PB and its negative wire —A/—B. The negative battery potential is connected to the private wire via the winding of relay KA, and to the negative wire via a resistance R2. When the circuit is selected for a call, a marker tests for these negative battery potentials and if they are present (indicating that the circuit is free) the market seizes the circuit by applying earth potential to the private wire. Relay KA operates to this earth potential. Relay KB does not operate to this earth potential due to the presence of rectifier R*f*1. Contacts KA1 open to remove the negative battery potential from the wire —A/—B, and contacts KA4 close to apply a busying earth to the busy/free wire B/F. Contacts KA2 and KA3 connect relays RHB and RHA to the holding wires HB and HA respectively. Relay RHA operates immediately to a negative battery extended over the holding wire HA from the through link between the ringing control circuit and the B side of the register involved in the call and its contact RHA1 prepares a circuit for the operation of relay KB. When the B side of the ringing control circuit is connected to the called line circuit, relay RHB operates to a negative battery extended over the holding wire HB from the through link between the ringing control circuit and the called line circuit. Contact RHB1 closes and relay KB is operated to earth potential extended through contacts RHA1 and RHB1. This earth potential also maintains relay KA operated when contacts KB1 changes-over to connect a winding of relay CF to the private wire PA/PB. It is at this stage in the establishment of a call that the register checks the communication paths established for the call, this checking being a so-called loop check which will be considered in greater detail with reference to FIGS. 17 and 18. Assuming the loop check to be satisfactory the register then applies a short term positive "Take Over Control" signal on the private wire. Relay CF operates to this signal and holds via its contact CF1 to a resistance earth from the bridge link in the long term path. The register then releases the short term path between its B side and the A side of the ringing control circuit. Relay RHA thus releases, but the circuit continues to hold to the earth at the contact CR4, relay CR having been operated by contact CT of relay CT, which latter was operated by contact CF2 when relay CF operated. Contacts CR1 and CR2 extend the ringing current feed (INT RING and RING RETURN BATT) to be called subscriber's line. Ringing continues until the called subscriber answers, when the called line circuit loop operates relay F. Contacts F2 and F3 disconnect the ringing circuit from the line. Contact F5 interrupts the holding circuit for relay CF and instead connects earth to the private wire to signal to the bridge link that the called subscribed has answered.

Relay CF releases, followed by relay CT which is slow-to-release, due to the element CR, in order that the hold winding of relay F will fully flux before relay CR is released by relay CT. Contact CR4 initiates the release sequence of relays KB, KA, HB and F. Relay F, being the last to release, maintains the busying earth on the busy/free wire B/F until the ringing control circuit is restored to normal.

A schematic diagram of a double-ended register is shown in FIG. 17. The register comprises a busy/free element 1 which indicates the busy and free conditions of the register by means of distinctive potentials on a busy/free lead 2. This lead 2 indicates the busy or free condition of the register to the associated register scanner (RSC–FIG. 1), to the group search unit (GS–FIG. 1 and thus the trunk translator), and to the dial path allotter of the incoming junction scanner (IJS–FIG. 1). The lead 2 is represenative of individual busy/free wires provided for these three busy/free functions. The register is taken into use for a call when it responds to its own identity tarnsmitted from the associated register scanner over a lead 3 which represents a group of register identity leads. When the register is taken into use the busy/free element 1 marks the busy/free lead 2 busy and also operates a seizure element 4.

The seizure element 4 includes a relay (not shown) which is operated when the element is seized and a contact 5 of this relay closes to apply an earth to the A side holding wire H so that the register is holding operated the cross-point relays through which a short-term path between a calling line circuit and the register is established. During the establishment of this short-term path, the calling line circuit is marked busy by the marker setting-up the path, but once the path is established a path and loop check element 6 tests the path and if it is satisfactory takes over from the marker to busy the calling line circuit. Circuit details of this element 6 will be considered later with reference to FIG. 18. Other relays (not shown) in the element 4 prime a series of information stores 7 of the register, these stores 7 affording the register access to the common control equipment through gates 8 which are controlled by the common control access scanner (ASC–FIG. 4). When the register responds to its own identity and is thus seized, the register receives from the common control equipment, the identity (directory number) of the calling line circuit which it stores in a store CLG, information as to the type (e.g. party line or ordinary line) of calling line circuit which it stores in a store TOC, and certain instructions which it stores in other stores and which pertain to the subsequent establishment of the call initiated by the calling line circuit. For instance, if the calling line circuit belonged to a party line there would be instructions telling the register to find out the X or Y identity of the party line and to re-apply to the common control equipment to inform it of this identity, following which the common control equipment would tell the register to send dial tone to the calling line unless the latter is prohibited from making outgoing calls.

Assuming the calling line circuit to be that of an ordinary line, the identity of this circuit in the store TOC brings about the operation of a "tones" element 11 which transmits dialling tone to the calling line. Subsequently dialled digit impulses sent from the calling line are received by an ABC element 12 in the register, this element being arranged to fulfill the well-known A impulsing, B holding and C switching functions in response to the loop conditions of the calling line. The element 12 passes the received impulses to a receive distributor 13 which distributes the received digits to storage elements of a "called line number" store CLD of the stores 7.

After the first digit has been received the receive distributor 13 applies a marking to an "apply to common control" element 9 which responds thereto to request access to the common control equipment over lead 10. Alternatively, a "come again with one" instruction stored in the register may request this access. This time when the register is given access to this equipment it transmits thereto all the information in its stores 7, this information including the first dialled digit and a staging signal indicative of how far the call in which the register is involved has progressed. This staging signal was written into an "instruction" store INS by the common control equipment at the previous coupling and now indicates to this equipment the stage reached in the setting-up of the call. Assuming that an ordinary local call is being set up, this is signified by the value of the first dialled digit or significant group to the common control equipment which is programmed to know that the register does not require its use again until the register has received all the digits of the called line. A marking to this effect is transmitted by the common control equipment to a "come again" store CAG in the register stores 9, following which the register is uncoupled from the common control equipment.

In the register, this marking in store CAG is aplied to a "come again control" element 14 which is responsive to this marking to prime a gate 15. The other input to this gate 15 is connected to the receive distributor 13 which, upon receiving the last dialled digit for distribution, applies a signal to the gate 15 to open it. The output from gate 15 operates the "apply to common control" element 9 again. It is to be appreciated that the gate 15 is representative of a plurality of such gates which can be selectively primed by the element 14 in dependence on the marking put into store CAG. The distributor 13 may apply a signal to each such gate in respect of each dialled digit, but only the gate primed by element 14 will open, to operate element 9, when the requisite number of dialled digits have been received.

On the next occasion that the register is given access to the common control equipment, the complete called directory number (not used at this stage) and accompanying staging signal is passed to the common control equipment. As previously described, the common control equipment is thereafter operable to establish a short-term path between the B side of the register and the A side of a selected ringing control circuit. Once this path has been established, a further relay (not shown) in the seizure element 4 is operated to close a contact 16 and thereby hold operated the cross-points through which the path is established. During the establishment of the path, the ringing control circuit is marked busy by the marker setting up the path, but once the path is established the element 6 tests the path and if it is satisfactory takes over from the marker to busy the ringing control circuit. Upon satisfactory checking of the path the element 6 once again operates the element 9 to cause the register to request recoupling to the common control equipment. As also previously described, the information sent from the register to the common control equipment results in the establishment of another short-term path from the B side of the ringing control circuit to the called line circuit. This path, as extended through the ringing control circuit to the register B side is also checked by the element 6, and if the check is satisfactory, the element 6 again operates element 9 to cause the register to request recoupling to the common control equipment. This time the calling and called directory numbers together with the appropriate "final connection" staging signal from the register result in the establishment of a long term path between the calling and called line circuits. The element 6 of the register checks the arrival of the calling side of the path and also checks all the wires of the path to the called line circuit via the ringing control circuit. If the checks are satisfactory, the element 6 operates a "signalling element" 16 which passes a signal over the P-wire to the ringing control circuit which responds to this signal, as already described with reference to FIG. 16, to commence ringing of the called line. The register thereafter releases itself.

Two other aspects of the register will be considered briefly. Firstly, in the case of an incoming junction call, the register may be coupled initially to the incoming junction via a dial path loop instead of through the switching network—see bibliographical references (*h*) and (*j*). In this case the seizure element 4 would be operated directly from the dial path by a signal applied over a lead 17, and a resultant signal from the element 4 would open a gate 18 to connect the incoming junction loop to an incoming dial path portion of the ABC element 12. Also, the equipment number of the incoming junction would be fed to the register from the dial path over a lead 19 and this number would pass through a gate 20, which is opened by a signal from the seizure element 4, to a store JEN. Once a path to the incoming junction has been established through the switching network proper, the setting-up of the call thereafter proceeds as previously described.

Secondly, in the case of an outgoing junction call, a through path from a calling line to an outgoing junction may be established sufficiently quickly for the dialled impulses from the calling line to pass directly to the outgoing junction without re-transmission of these impulses by the register. However, if re-transmission of dialled impulses by the register is decided upon by the common control equipment from the information passed to it by the register in respect of the call, then a pulse control and send distributor 21 in the register is rendered operative by information fed to it from a store OGJ which is representative of information stores pertaining to outgoing junction working, and which is fed information appropriate to the outgoing junction call from the common control equipment.

For releasing the register at the end of a path setting sequence, or in the event of a call failure, there is provided a "release control" element 22. Release of the register may be initiated by the element 6, by the receive distributor 13, or by the pulse control and send distributor 21, depending upon circuit conditions. A release signal received from any of these elements by the "release control" element 22 causes the latter to release the "seizure" element 4 to bring about release of the register.

It is not thought necesary to give circuit details of any of the register elements, with the exception of the path and loop check element 6, because all the other elements perform functions which are well known in the telecommunications art and can be realised with known circuitry For instance, the gates referred to in the register can be transistor pulse-plus-bias gates in which a transistor produces a signal in response to a pulse applied to its base only if the emitter of the transistor is receiving a suitable biasing signal. The stores referred to may be composed of transistor bistable elements of well-known form. The send and receive distributors may be counting chains composed of bistable elements. The other control and seizure elements may be realised with relay circuits. It is furthermore to be understood that only those register elements which are essential for an appreciation of the present invention have been considered and that, in practice, the register may have numerous other elements such as an X and Y party detector for subscriber line sharing, and time-out elements which after a predetermined time interval bring about the release, and possibly "parking" of the register in the event of a call failure. Also, the register may include counters which count each call failure both in regard to failure to check-out a short-term path and in regard to failure to check-out a loop (long-term) path, and which indicate these failures to the common control equipment.

With regard to the path and loop checking facilities afforded by the register, these will now be considered with reference to FIG. 18. In FIG. 18 there is shown the negative (−) wire, the positive (+) wire and the P-wire of the paths of the trunking plot shown in FIG. 2, together with the signalling elements associated with these paths. When the short term path between the calling line circuit and the A side of the register REG is established, the negative battery behind two relays KA and KB in the calling line circuit is extended over the P-wire to the A side of the register. No other details of the line circuit need be considered for the present purposes, but the line circuit is conveniently of the form described in bibliographical reference (P). In the register, this negative battery is applied to the base of a transistor T*r*1 and renders this transistor conducting. With transistor T*r*1 conducting, the potential at its base/emitter junction is a resistive earth (clamped by Zener diode ZD1), and this resistive earth completes a holding circuit for relays KA and KB (previously operated by marker). Thus, supervision of the calling line circuit LC is vested in the register as aforesaid. Also, when transistor T*r*1 is conducting, a relay RPA in its collector circuit is operated, and contacts RPA1 and RPA2 of this relay close to connect an impulsing relay A (or the equivalent—for instance a saturable reactor loop detector as aforesaid) to the negative and positive wires (−) and (+). This relay A operates to the loop across the calling line, as represented by the resistance R*g*, and contact A1 of this relay closes to signify in the register the existence of the calling line loop condition. These operations serve to check the wires of the path between the calling line circuit and the register REG in that the P-wire must be satisfactory before relay RPA can operate and the negative (−) and positive (+) wires must be satisfactory before the relay A can operate. Also, it follows that the holding wire (not shown) of the path must also be satisfactory if the other wires are.

The wires of the short term path established between the B side of the register REG and the ringing control circuit RC are checked as follows.

It will be recalled from the description of the ringing control circuit (FIG. 16), that in the unoperated condition of this circuit a relay KA is connected to the P-wire. When the B side of the register REG is connected to the A side of the ringing control circuit RC, the negative battery behind this relay KA is extended over the P-wire to the B side of the register. At the B side of the register is connected the base of another transistor T*r*2 which is rendered conducting by this negative battery and, in the same way as the transistor T*r*1 at the register A side, puts a resistive earth (clamped by Zener diode ZD2) on the P-wire. This resistive earth completes a holding circuit for relay KA (operated by marker) in circuit RC, thereby proving the P-wire (and thus the holding wire) for this path. Similarly, when the short term path is completed from the B side of the ringing control circuit RC to the called line circuit, the two relays KA and KB in the called line circuit hold to the resistive earth from transistor T*r*2. By this time, relay KA in the ring control circuit RC will have been switched from the P-wire, as described with reference to FIG. 16, and there will be a period of non-conduction of the transistor T*r*2 between the time ringing control circuit relay KA is switched from the P-wire and the time the P-wire is extended to the called line circuit relays KA and KB. Thus transistor T*r*2 is rendered conductive twice and a relay RPB in its collector circuit is operated, released and then operated again, and a contact RPB1 closes twice to signify in the register the two path checks.

When the long term path is established so that the bridge link LC3 is connected between the calling and called line circuits, the final loop check is effected by the register as follows. The calling line loop operates relay LA in the bridge link, and its contacts LA1 and LA2 close to prepare an operating circuit for a relay LB in the bridge link. Also, the negative battery behind relays KA and KB in the called line circuit renders conducting a transistor T*r*3 in the bridge link. With transistor T*r*3 conducting the potential at its base/emitter junction is a resistive earth (clamped by Zener diode ZD3) which, when the register releases, marks the called line circuit P-wire busy and holds relays KA and KB operated instead of the resistive earth from transistor T*r*2 in the register. A relay PE in the collector circuit of transistor T*r*3 operates when this transistor is conducting, and contact PE1 of this relay closes to apply earth to the P-wire at the A side of the register. This earth holds the calling line circuit relays KA and KB operated. Temporary supervision of the calling and called line circuit is now vested in the bridge link. The earth from the bridge link via contact PE1 also renders transistor T*r*1 non-conducting in the register, so that relay RPA is released and contacts RPA1 and RPA2 open to remove relay A from the calling line loop so that relay A releases. At the other side of the bridge link LC3 contacts PE2 and PE3 of relay PE close to connect relay LB to the positive (+) and negative wires (−) extending to the B side of the register. The negative battery and earth behind relay LB constitute a current feed into the B side of the register and this current feed operates a relay HR in the register. For relay HR to operate the positive (+) and negative (−) wires from each side of the bridge link to the register must be satisfactory, and so must the P-wire from the bridge link to the called line circuit. The release of relay RPA proves the P-wire at the calling line circuit side of the bridge link. Here also, it follows that the holding wires must be satisfactory if the other wires are. When relay HR operates, a contact HR1 thereof closes to signify, in conjunction with the release of relay RPA, the satisfactory path check, following which the register releases.

In the case of a connection path established to an outgoing junction, the bridge link LC3 would be replaced by a splittable through link and there would be a path from the B side of the register to the outgoing junction which does not include a ringing control circuit. In this instance, the positive (+), negative (—) and P-wire conditions of the calling line circuit would be extended through such link to the B side of the register for the checking of the long term path. As regards the P-wire check, the transistor *Tr*2 in the register would operate in this instance to the negative battery from the outgoing junction. A subsequent full earth (not shown) from the register B side holds the outgoing junction busy. The positive (+) and negative (—) wires are checked using the current feed from the negative battery and earth behind relay A in the register itself. However, since the resistance (*Rg*) of the calling line circuit may vary quite extensively from line to line, and as this resistance would affect considerably the magnitude of current feed from relay A, it is not possible in this instance to rely on the operation of relay HR for a satisfactory condition of the positive (+) and negative (—) wires in the loop check. Instead, for a loop check where a bridge link is not used, the relay HR is switched from the positive (+) and negative (—) wires at the B side of the register and another loop check element comprising two relays PC and NC and two capacitors C— and C+ is switched to these positive (+) and negative (—) wires. This switching may be effected as by means of changeover contacts CO1 and CO2 of a relay (not shown) which is operated in response to an indication received by the register from the common control equipment as to the type of connection being established. With contacts CO1 and CO2 operated the capacitors C+ and C— are at one side connected to the positive (+) and negative (—) wires respectively and at their other sides to a source of positive voltage (+). Thus these capacitors are charged by the current feed received at the register B side from the register A side. After a pre-determined time period determined in the register (this period being timed by means of any suitable known form of timing element—not shown), further changeover contacts *tc*1 to *tc*4 are operated to disconnect the capacitors C— and C+ from the charging circuits and instead connect them across one winding of respective ones of the two relays PC and NC. If the capacitors C— and C+ have become sufficiently charged, thereby proving the postive (+) and negative (—) wires in the loop, their discharge current will operate relays PC and NC which are arranged to hold over their other windings over circuits completed by contacts PC1 and NC1 respectively. Other contacts PC2 and NC2 of these relays close to indicate in the register the satisfactory checking of the positive (+) and negative (—) wires in the loop check.

BIBLIOGRAPHY

| Reference letter | Reference |
|---|---|
| (a) ---- | U.S. Patent No. 3,272,924. |
| (b) ---- | U.S. Patent No. 3,214,524. |
| (c) ---- | U.S. Patent No. 3,417,205. |
| (d) ---- | U.S. Patent No. 3,420,962. |
| (e) ---- | U.S. Patent No. 3,395,253. |
| (f) ---- | U.S. Patent No. 3,129,293. |
| (g) ---- | British patent specification No. 989,340. |
| (h) ---- | U.S. Patent No. 3,301,960. |
| (j) ---- | U.S. Patent No. 3,349,188. |
| (k) ---- | U.S. Patent No. 3,404,314. |
| (m) ---- | U.S. Patent No. 3,449,521. |
| (n) ---- | British patent specification No. 1,120,436. |
| (p) ---- | U.S. Patent No. 3,426,155. |

What I claim is:

1. An automatic telecommunication switching system comprising:

(a) a switching network having switching means arranged in at least one switching stage and operable to effect connections through said switching network between one side and the other thereof;

(b) line terminals connected at said one side of said switching network;

(c) link circuits connected at said other side of said switching network;

(d) line circuits connected to certain of said line terminals;

(e) items of auxiliary equipment, including registers, connected to others of said line terminals, said items of auxiliary equipment being for use in the establishment of calls between calling and called line circuits as and when required; and (f) common control equipment for controlling the operation of said switching means in the establishment of communication paths through the switching network between specific calling and called line circuits, said common control equipment being operable for a call between calling and called line circuits to cause the establishment of at least two communication paths through said switching network between line terminals thereof, each path extending through the switching network to a link circuit and back through the switching network, one of these paths being a short-term communication path which extends through the switching network between line terminals to which the calling line circuit and one of said registers are connected respectively, said register including means for receiving and storing the identity of the called line circuit as transmitted to it over said short-term path from said calling line circuit, and means for indicating such identity to the common control equipment, and the common control equipment being responsive to such identity to cause said switching means to establish connection between said calling and called line circuits over a long term communication path through said switching network.

2. A system as claimed in claim 1, wherein apparatus controlling the application of ringing current in the establishment of calls is provided in a plurality of ringing control circuits which constitute one type of auxiliary equipment connected to line terminals of the switching network.

3. A system as claimed in claim 1, wherein the switching network is arranged to provide communication paths for local traffic and junction traffic through separate switching trains, and wherein the auxiliary equipments are connected to line terminals accessible to the junction switching trains.

4. A system as claimed in claim 3, wherein all the auxiliary equipments of like type are arranged as a single group which is accessible to the switching network as a whole.

5. A system as claimed in claim 4, wherein auxiliary equipment groups of like type are sub-grouped, whilst remaining accessible to the switching network as a whole.

6. An automatic telecommunication switching system comprising:

(a) a switching network having switching means arranged in at least one switching stage and operable to effect connections through said switching network between one side and the other thereof;

(b) line terminals connected at said one side of said switching network;

(c) link circuits connected at said other side of said switching network;

(d) line circuits connected to certain of said line terminals;

(e) items of auxiliary equipment, including registers, connected to others of said line terminals, said items of auxiliary equipment being for use in the establishment of calls between calling and called line circuits as and when required; and (f) common control equipment for controlling the operation of said switching means in the establishment of communication paths through the switching network between specific calling and called line circuits, said common control equipment being operable for a call between calling and called line circuits to establish through the switching network a plurality of separate short term communication paths of which one short term path affords connection between line terminals giving access to the calling line circuit and line terminals to which is connected one of said registers, another short term path affords connection between line terminals giving access to the called line circuit and line terminals to which another item of auxiliary equipment is connected, and at least one intermediate short term path affords connection between said register and such other item of auxiliary equipment, and wherein also, dependent upon the called line circuit being free and available, the common control equipment is subsequently operable to establish in parallel with the short term communication paths a long term communication path between the line terminals giving access to the calling and called line circuits whereby to establish from one side to the other of said register a composite path including the said long term communication path and the several short-term communication paths in serial relationship, said register including means for checking the satisfactory establishment of all of the communication paths prior to the release of the short term paths and the items of equipment which they interconnect.

7. A system as claimed in claim 6, wherein for a call between calling and called lines that has allocated to it in said long term communication path a bridge link circuit including a transmission bridge, said path checking means is arranged to check the continuity of the speech (positive and negative) wires of said composite path by responding to a first current feed fed over said speech wires from one said bridge link circuit to one side of said register, and by responding to a second current feed fed over said speech wires from the other side of said bridge link circuit to the other side of said register.

8. A system as claimed in claim 6, wherein for a call between calling and called lines that has allocated to it in said long term communication path a link circuit in the form of a "through" link, said path checking means is arranged to check the continuity of the speech (positive and negative) wires of said composite path by itself applying a current feed at one of its sides to said speech wires and by responding to such current feed as fed over the speech wires to its other side.

9. A system as claimed in claim 6, wherein said switching network comprises a plurality of separate sections to each of which said line terminals and auxiliary equipments are connected, and wherein said auxiliary equipments include transfer circuits for serially interconnecting a said communication path in one section with a said communication path in another section for the establishment of a path between first and second line terminals when there is no free route, or insufficient free routes, between said first and second line terminals within one said section.

10. A system as claimed in claim 6 wherein said connection between said register and such other item of auxiliary equipment includes at least one further intermediate item of auxiliary equipment and appropriate short-term communication paths depending on the type of call, the auxiliary equipments usable with such short-term paths each having two points of access to the switching networks at the line terminals.

References Cited

UNITED STATES PATENTS

| | | | |
|---|---|---|---|
| 3,290,446 | 12/1966 | Ceonzo et al. | 179—18 |
| 3,308,242 | 7/1967 | Erwin | 179—18 X |

WILLIAM C. COOPER, Primary Examiner